(12) United States Patent
Li et al.

(10) Patent No.: US 9,927,816 B2
(45) Date of Patent: Mar. 27, 2018

(54) SYSTEM AND METHOD FOR OPERATING A FOLLOWER VEHICLE IN A VEHICLE PLATOON

(71) Applicant: Macau University of Science and Technology, Taipa (MO)

(72) Inventors: Zhiwu Li, Taipa (MO); Oussama Karoui, Taipa (MO); Anis Koubaa, Riyadh (SA); Mohamed Khalgui, Carthage (TN); Emna Guerfala, Carthage (TN); Eduardo Tovard, Porto (PT); Naiqi Wu, Taipa (MO)

(73) Assignee: Macau University of Science and Technology, Taipa (MO)

( * ) Notice: Subject to any disclaimer, the term of this patent is extended or adjusted under 35 U.S.C. 154(b) by 28 days.

(21) Appl. No.: 15/153,778

(22) Filed: May 13, 2016

(65) Prior Publication Data
US 2017/0329348 A1 Nov. 16, 2017

(51) Int. Cl.
*G05D 1/02* (2006.01)
*G05D 1/00* (2006.01)

(52) U.S. Cl.
CPC ......... *G05D 1/0295* (2013.01); *G05D 1/0027* (2013.01); *G05D 1/0212* (2013.01); *G05D 1/0278* (2013.01)

(58) Field of Classification Search
CPC .. G05D 1/0295; G05D 1/0212; G05D 1/0027; G05D 1/0278
See application file for complete search history.

(56) References Cited

U.S. PATENT DOCUMENTS 6,313,758 B1 * 11/2001 Kobayashi ............. G08G 1/162
340/436
2008/0258890 A1 * 10/2008 Follmer ................ B60R 25/102
340/439

(Continued)

OTHER PUBLICATIONS

M. Alsabaan, K. Naik, and T. Khalifa, "Optimizatinon of Fuel Cost and Emissions Using V2V Communications", IEEE Transactions on Intelligent Transportation Systems, vol. 14, No. 3, Sep. 2013, pp. 1449-1461; DOI: 10.1109/TITS.2013.2262175.

(Continued)

*Primary Examiner* — Mary D Cheung
(74) *Attorney, Agent, or Firm* — Renner Kenner Greive Bobak Taylor & Weber

(57) ABSTRACT

A method for operating a follower vehicle in a vehicle platoon includes determining, during operation, whether the follower vehicle is operating in a normal state or an abnormal state based on an operation condition of a component of the follower vehicle, or a communication between the follower vehicle and a preceding vehicle in the vehicle platoon. The method further includes selecting a first control mode if the follower vehicle is in the normal state and a second control mode if the follower vehicle is in the abnormal state so as to control movement of the follower vehicle using the selected control mode. In the first control mode, the follower vehicle uses communication data received from the preceding vehicle in the vehicle platoon to control its movement. In the second control mode, the follower vehicle uses data obtained by one or more of its sensors to control its movement.

18 Claims, 19 Drawing Sheets

(56) References Cited

U.S. PATENT DOCUMENTS

| | | | | |
|---|---|---|---|---|
| 2013/0066511 | A1* | 3/2013 | Switkes | G08G 1/166 |
| | | | | 701/28 |
| 2016/0146618 | A1* | 5/2016 | Caveney | G05D 1/06 |
| | | | | 701/25 |
| 2017/0072967 | A1* | 3/2017 | Fendt | B60W 50/023 |
| 2017/0183007 | A1* | 6/2017 | Oh | B60W 30/16 |

OTHER PUBLICATIONS

R. He, A. F. Molisch, F. Tufvesson, Z. Zhong, B. Al, and T. Zhang, "Vehicle-to-Vehicle Propagation Models with Large Vehicle Obstructions", IEEE Transactions on Intelligent Transportation Systems, vol. 15, No. 5, Oct. 2014, pp. 2237-2248; DOI: 10.1109/TITS.2014.2311514.

J. Ward, S. Worrall, G. Agamennoni, and E. Nebot, "The Warrigal Dataset: Multi-Vehicle Trajectories and V2V Communications", IEEE Intelligent Transportation Systems Magazine, vol. 6, Fall 2014, pp. 109-117; DOI: 10.1109/MITS.2014.2315660.

H. A. Malki, D. Misir, D. Feigenspan, and G. Chen, "Fuzzy PID Control of a Flexible-Joint Robot Arm with Uncertainties from Time-Varying Loads", IEEE Transactions on Control Systems Technology, vol. 5, No. 3, May 1997, pp. 371-378.

A. Casimiro, J. Kaiser, E. M. Schiller, P. Costa, J. Parizi, R. Johansson, and R. Librino, "The Karyon Project: Predictable and Safe Coordination in Cooperative Vehicular Systems", In: Proceedings of the IEEE/IFIP International Conference on Dependable Systems and Networks Workshop (DSN-W '14); Jun. 24-27, 2013, Budapest, IEEE, pp. 1-12.

T. Robinson, E. Chan, and E. Coelingh, "Operating Platoons on Public Motorways: An Introduction to the SARTRE Platooning Programme", In: 17th World Congress on Intelligent Transport Systems, Oct. 2010, Busan, pp. 1-11.

E. Chan, P. Gilhead, P. Jelinek, P. Krejci, and T. Robinson, "Cooperative Control of SARTRE Automated Platoon Vehicles", In: 19th ITS World Congress, Oct. 22-26, 2012, Vienna, Austria, pp. 1-9.

E. Van Nunen, M. Kwakkernaat, J. Ploeg, and B. D. Netten, "Cooperative Competition for Future Mobility", IEEE Transactions on Intelligent Transportation Systems, vol. 13, No. 3, Sep. 2012, pp. 1018-1025; DOI: 10.1109/TITS.2012.2200475.

J. Ploeg, D. P. Shukla, N. Van De Wouw, and H. Nijmeijer, "Controller Synthesis for String Stability of Vehicle Platoons", IEEE Transactions on Intelligent Transportation Systems, vol. 15, No. 2, Apr. 2014, pp. 854-865; DOI: 10.1109/TITS.2013.2291493.

A. Ghasemi, R. Kazemi and S. Azadi, "Stable Decentralized Control of a Platoon of Vehicles with Heterogeneous Information Feedback", IEEE Transactions on Vehicular Technology, vol. 62, No. 9, Nov. 2013, pp. 4299-4308; DOI: 10.1109/TVT.2013.2253500.

S. Solyom and E. Coelingh, "Performance Limitations in Vehicle Platoon Control", In: 2012 15th International IEEE Conference on Intelligent Transportation Systems, Sep. 16-19, 2012, Anchorage, AK, USA, pp. 1-6; DOI: 10.1109/MITS.2013.2272174.

G. Antonelli, "Interconnected Dynamic Systems: An Overview on Distributed Control", IEEE Control Systems Magazine, Feb. 2013, vol. 33, pp. 76-88; DOI: 10.1109/MCS.2012.2225929.

E. Kita, H. Sakamoto, H. Takaue, and M. Yamada, "Robot Vehicle Platoon Experiment Based on Multi-Leader Vehicle Following Model", In: Proceedings of the Second International Symposium on Computing and Networking (CANDAR); Dec. 10-12, 2014; Shizuoka: IEEE. pp. 491-494; DOI: 10.1109/CANDAR.2014.30.

Z. Huang, Q. Wu, J. Ma, and W. Tian, "Modeling and Simulation of Cooperative Strategies for Vehicle Platoon Longitudinal Control", In: Proceedings of the International Conference of Transportation Professionals (COTA '14); Jul. 4-7, 2014; Changsha, China: ASCE. pp. 498-512.

M. Senturk, I. M. C. Uygan, and L. Guvenc, "Mixed Cooperative Adaptive Cruise Control for Light Commercial Vehicles", In: Proceedings of the IEEE International Conference on the Systems Man and Cybernetics (SMC '10); Oct. 10-13, 2010; Istanbul, IEEE. pp. 1506-1511.

S. Oncu, N. Van De Wouw, and H. Nijmeijer, "Cooperative Adaptive Cruise Control: Tradeoffs Between Control and Network Specifications", In: Proceedings of the IEEE International Conference on Intelligent Transportation Systems (ITSC '14), Oct. 5-7, 2011, Washington, D.C., USA, IEEE pp. 2051-2056.

H. Zhou, R. Saigal, F. Dion, and L. Yang, "Vehicle Platoon Control in High-Latency Wireless Communications Environment", Transportation Research Record: Journal of the Transportation Research Board, 2012 No. 2324, pp. 81-90; DOI: 10.3141/2324-10.

P. Fernandes and U. Nunes, "Platooning of Autonomous Vehicles with Intervehicle Communications in SUMO Traffic Simulator", In: Proceedings of the IEEE International Conference on Intelligent Transportation Systems (ITSC '13), Sep. 19-22, 2010, Madeira Island, Portugal, pp. 1313-1318.

A. Ali, G. Garcia, and P. Martinet, "The Flatbed Platoon Towing Model for Safe and Dense Platooning on Highways", IEEE Intelligent Transportation Systems Magazine, Spring 2015, pp. 58-68; DOI: 10.1109/ MITS.2014.2328670.

C. Lei, E. M. Van Eenennaam, W. K. Wolterink, G. Karagiannis, G. Heijenk, and J. Poleg, In: Proceedings of the International Conference on ITS Telecommunications (ITST '11); Aug. 23-25, 2011, Anchorage St. Petersburg, p. 381-386.

D. Jia, K. Lu, and J. Wang, "A Disturbance-Adaptive Design for VANET-Enabled Vehicle Platoon", IEEE Transactions on Vehicular Technology, vol. 63, No. 2, Feb. 2014, pp. 527-539; DOI: 10.1109/TVT.2013.2280721.

P. Ioannou and Z. Xu, "Throttle and Brake Control Systems for Automatic Vehicle Following", California PATH Program, Institute of Transportation Studies, University of California, Berkeley; UCB-ITS-PRR-94-10, pp. 1-32, Apr. 1994.

W. Wang, "The Safety and Comfort Control of Vehicles by the Separation Principle of Pid Controller Tuning", In: Proceedings of the IEEE International Conference on Industrial Technology (ICIT), Mar. 14-17, 2010, pp. 145-150.

E. Guerfala, M. Khalgui, A. Koubaa, and O. Karoui, "Modeling and Formal Verification of Reconfigurable Vehicular Platoons", In: European Simulation and Mdelling Conference (ESM), Oct. 26-28, 2015.

R. Kelly, "A Tuning Procedure for Stable PID Control of Robot Manipulators", Robotica, 1995, vol. 13, No. 2, Mar. 1995, pp. 141-148; DOI: 10.1017/S0263574700017641.

M. E. Cannon, C. Basnayake, S. Crawford, S. Syed, and G. Lachapelle, "Precise GPS Sensor Subsystem for Vehicle Platoon Control", In: ION GPS/GNSS 2003 Conference, Sep. 9-12, 2003, Portland, OR, p. 1-12.

C.-S. Park, Y.-D. Hong, and J.-H. Kim, "Evolutionary-Optimized Central Pattern Generator for Stable Modifiable Bipedal Walking", IEEE/ASME Transactions on Mechatronics, vol. 19, No. 4, Aug. 2014, pp. 1374-1383; DOI: 10.1109/TMECH.2013.2281193.

Y. Guo, S. Zhang, A. Ritter, and H. Man, "A Case Study on a Capsule Robot in the Gastrointestinal Tract to Teach Robot Programming and Navigation", IEEE Transactions on Education, vol. 57, No. 2, May 2014, pp. 112-121; DOI: 10.1109/TE.2013.2281025.

Z. Yan, N. Jouandeau, and A. A. Cherif, "A Survey and Analysis of Multi-Robot Coordination", International Journal of Advanced Robotic Systmes, 2013, vol. 10, 399:2013 pp. 1-18; DOI: 10.5772/57313.

H. Diab, I. B. Makhlouf, and S. Kowalewski, "A Platoon of Vehicles Approaching an Intersection: A Testing Platform for Safe Intersections", In: Proceedings of the IEEE International Conference on Intelligent Transportation Systems (ITSC '15), Sep. 16-19, 2012, Anchorage, Alaska, pp. 1918-1923.

T. Sugano, Y. Dan, H. Okajima, N. Matsunaga, and Z. Hu, "Platoon Driving Experiment of Electric Wheelchair in Narrow Space by using Model Error Compensator", In: Proceedings of the Advance Mechatronic Systems (ICAMechS '14), Aug. 10-12, 2014, Kumamoto, Japan, pp. 324-329.

(56) References Cited

OTHER PUBLICATIONS

G. Guo and W. Yue, "Atonomous Platoon Control Allowing Range-Limited Sensors", IEEE Transactions on Vehicular Technology, vol. 61, No. 7, Sep. 2012, pp. 2901-2912; DOI: 10.1109/TVT.2012.2203362.

* cited by examiner

SYSTEM AND METHOD FOR OPERATING A FOLLOWER VEHICLE IN A VEHICLE PLATOON

TECHNICAL FIELD

The present invention relates generally to a system and method for operating a vehicle platoon, and more particularly, although not exclusively, to a system for operating a vehicle platoon having a control mechanism associated with an algorithm for manipulating the movement of the vehicles.

BACKGROUND

Self-driving car technologies such as grouping vehicles into platoons are under rapid development. In a vehicle platoon, a set of autonomous vehicles generally navigate according to a trajectory defined by a leading vehicle, which is typically manually controlled by a professional driver. Vehicle platoon eliminates the need for human reaction to sudden road events such as braking, and thereby allows a closer safety distance than human driven vehicles. Moreover, the use of vehicle platoons can reduce traffic congestion and the chance of accident, and can provide improved fuel economy to the vehicles.

While modelling and simulations have been utilised in the study of vehicle platoons, these simulations have not taken any degrading factors such as communication error or real time environment disturbances encountered by the vehicles into account. Thus, the quality and stability of these vehicle platoon simulations are not guaranteed or even impractical for real time road traffic applications. An improved simulation and control method of operating vehicle platoons is desirable.

SUMMARY OF THE INVENTION

In accordance with a first aspect of the present invention, there is provided a method for operating a follower vehicle in a vehicle platoon, comprising the steps of:
(a) determining, during operation, whether the follower vehicle is operating in a normal state or an abnormal state based on an operation condition of a component of the follower vehicle, or a communication between the follower vehicle and a preceding vehicle in the vehicle platoon; and
(b) selecting a first control mode if the follower vehicle is in the normal state and a second control mode if the follower vehicle is in the abnormal state (also referred to below as the "degraded state") so as to control movement of the follower vehicle using the selected control mode;
wherein in the first control mode, the follower vehicle uses communication data received from the preceding vehicle in the vehicle platoon to control its movement; and in the second control mode, the follower vehicle uses data obtained by one or more of its sensors to control its movement.

Preferably, the preceding vehicle is the vehicle immediately in front of the follower vehicle along the travel direction. However, in one embodiment, the preceding vehicle can be any vehicle in front of the follower vehicle.

In a preferred embodiment, in the first control mode, the follower vehicle uses communication data received from the preceding vehicle as well as data obtained by one or more of its sensors to control its movement. In a preferred embodiment, in the second control mode, the follower vehicle uses only the data obtained by one or more of its sensors to control its movement.

In one embodiment, the component may be a driving unit, a power unit, a communication module, etc. of the follower vehicle.

In one embodiment of the first aspect, the method further comprises the step of receiving, at the follower vehicle, a signal indicative of the operation condition of the component or a communication signal transmitted from the preceding vehicle prior to step (a).

In one embodiment of the first aspect, the follower vehicle is determined to be operating in the abnormal state in step (a) when the component of the follower vehicle is determined to have abnormal operating condition; or the communication between the follower vehicle and the preceding vehicle is determined to be absent, have lost or have a quality below a threshold. Preferably, abnormal operating condition refers to the state that at least some of the functionality of the component is compromised.

In one embodiment of the first aspect, in step (a), the determination of whether the follower vehicle is operating in a normal state or an abnormal state is based on both the operation condition of the component of the follower vehicle and the communication between the follower vehicle and a preceding vehicle.

In one embodiment of the first aspect, the method further comprises, after step (b), the step of determining, at the follower vehicle, a distance between the follower vehicle and the preceding vehicle and a deviation of the preceding vehicle with respect to the follower vehicle. The deviation preferably refers to an angular direction of travel of the vehicles.

In one embodiment of the first aspect, in the first control mode, the distance is determined based on differential GPS using the following information: a local coordinate of the follower vehicle; a local orientation of the follower vehicle; and a GPS coordinate and a GPS orientation of the preceding vehicle that are received from the preceding vehicle. In one embodiment, other satellite navigation systems and methods may be used in combination with a local navigation system and method so as to replace differential GPS. Examples of these satellite navigation systems include GLONASS, BeiDou, Galileo, QZSS and IRNSS.

In one embodiment of the first aspect, in the first control mode, the deviation is determined using the information for differential GPS and orientation information obtained using a compass at the follower vehicle.

In one embodiment of the first aspect, in the second control mode, the distance and the deviation are determined using the one or more sensors of the follower vehicle. Preferably, the one or more sensors are arranged to transmit and receive electromagnetic or acoustic signals for distance and deviation determination. In one example, the one or more sensors utilize a time-of-flight method to determine distance. The one or more sensors may also detect signals in the environment such that the road on which the vehicle is travelling.

In one embodiment of the first aspect, the method further comprises the steps of: controlling a velocity of the follower vehicle so as to maintain a reference distance between the follower vehicle and the preceding vehicle; and controlling turning of wheels of the follower vehicle so as to enable the follower vehicle to follow the deviation of the preceding vehicle; thereby allowing the follower vehicle to substantially follow a trajectory of the preceding vehicle. The term "substantially" is used because in practice the follower vehicle may not always follow strictly the trajectory of the preceding vehicle due to errors or tolerances of vehicle components.

In one embodiment of the first aspect, the control of the velocity is based on $$u_i(t) = K_p * e_i(t) + k_i * \int e_i(t)dt + k_d * \frac{de_i(t)}{dt}$$

where $u_i(t)$ is an acceleration value of the follower vehicle $V_i$; $K_p$, $K_i$, $K_d$ are, respectively, proportional, integrator and derivative gains constant; $e_i(t)$ is an error value at time t with $e_i(t)=D_{i,i-1}-D_{ref}$; $D_{i,i-1}$ is a detected distance between the follower vehicle and the preceding vehicle; and $D_{ref}$ is the predetermined reference distance between the follower vehicle and the preceding vehicle.

In one embodiment of the first aspect, the control of the deviation is based on $$\theta_i(t) = PID_{Steer}(\theta_L)$$

where the PID steer function is defined by $$u_i(t) = K_{pl} * e_{il}(t) + k_{il} * \int e_{il}(t)dt + k_{dl} * \frac{de_{ij}(t)}{dt};$$

where $u_i(t)$ is an acceleration value of the follower vehicle $V_i$; $e_{il}(t)$ is the error value of the follower vehicle $V_i$; $e_{il}(t)=\theta_F-\theta_L$; $\theta_F$ is an angle of travel of the follower vehicle $V_i$ at time t; $\theta_L$ is an angle of travel of the preceding vehicle $V_{i-1}$ direction at time t-δt; and $K_{pl}$, $K_{il}$, $K_{dl}$ are, respectively, proportional, integral and derivative gain constants.

In one embodiment of the first aspect, the control of the velocity further comprises the step of adjusting $K_p$, $K_i$, $K_d$ so as to control the velocity of the follower vehicle.

In one embodiment of the first aspect, the control of the deviation further comprises the step of adjusting $K_{pl}$, $K_{il}$, $K_{dl}$ so as to control the deviation of the follower vehicle.

In one embodiment of the first aspect, the adjustment of $K_p$, $K_i$, $K_d$ is dependent on a travel velocity of the follower vehicle. In one embodiment, the $K_p$, $K_i$, $K_d$ for the follower vehicle in the normal state may be different for different travel speeds. In one embodiment, the $K_p$, $K_i$, $K_d$ for the follower vehicle in the abnormal state may be different for different travel speeds.

In one embodiment of the first aspect, the adjustment of $K_{pl}$, $K_{il}$, $K_{dl}$ is dependent on a travel velocity of the follower vehicle. In one embodiment, the $K_{pl}$, $K_{il}$, $K_{dl}$ for the follower vehicle in the normal state may be different for different travel speeds. In one embodiment, the $K_{pl}$, $K_{il}$, $K_{dl}$ for the follower vehicle in the abnormal state may be different for different travel speeds.

In one embodiment of the first aspect, the method further comprises the step of momentarily switching from the first control mode to the second control mode when the follower vehicle is in the normal state. Preferably, this provides a checking function that allows the follower vehicle to determine whether the communication data received at the first control mode is accurate.

In one embodiment of the first aspect, the method further comprises the step of: operating the follower vehicle in a third mode at a predetermined time interval during operation of the follower vehicle, wherein in the third mode, the follower vehicle: determines the distance between the follower vehicle and the preceding vehicle and the deviation of the preceding vehicle with respect to the follower vehicle using the one or more sensors of the follower vehicles as well as based on data communicated from the preceding vehicle; compares a distance and deviation measure determined based on data obtained from the one or more sensors of the follower vehicles with a distance and deviation measure determined based on data communicated from the preceding vehicle; and switches to the second control mode if the comparison result has an difference larger than a predetermined value. A large difference between the distance and deviation measure determined based on data obtained from the one or more sensors of the follower vehicles and the distance and deviation measure determined based on data communicated from the preceding vehicle reflects that at least some components of the vehicle is defective or has failure.

In accordance with a second aspect of the present invention, there is provided a system for operating a follower vehicle in a vehicle platoon, comprising: a communication module arranged to receive a signal indicative of the operation condition of a component or a communication signal transmitted from the preceding vehicle; and one or more processors arranged to determine, during operation, whether the follower vehicle is operating in a normal state or an abnormal state based on the received signal indicative of the operation condition of a component of the follower vehicle, or a communication between the follower vehicle and a preceding vehicle in the vehicle platoon; and select a first control mode if the follower vehicle is in the normal state and a second control mode if the follower vehicle is in the abnormal state so as to control movement of the follower vehicle using the selected control mode; wherein in the first control mode, the follower vehicle uses communication data received from the preceding vehicle in the vehicle platoon to control its movement; and in the second control mode, the follower vehicle uses data obtained by one or more of its sensors to control its movement. Preferably, the communication module and the one or more processors are operably connected with each other and are both arranged on the follower vehicle. The communication module is a wireless communication module.

In one embodiment of the second aspect, the one or more processors are further arranged to determine a distance between the follower vehicle and the preceding vehicle and a deviation of the preceding vehicle with respect to the follower vehicle.

In one embodiment of the second aspect, the system further comprises a controller arranged to control a velocity of the follower vehicle so as to maintain a reference distance between the follower vehicle and the preceding vehicle; and control turning of wheels of the follower vehicle so as to enable the follower vehicle to follow the deviation of the preceding vehicle; thereby allowing the follower vehicle to substantially follow a trajectory of the preceding vehicle. Preferably, the controller is operably connected with the communication module and the one or more processors and is arranged on the follower vehicle.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
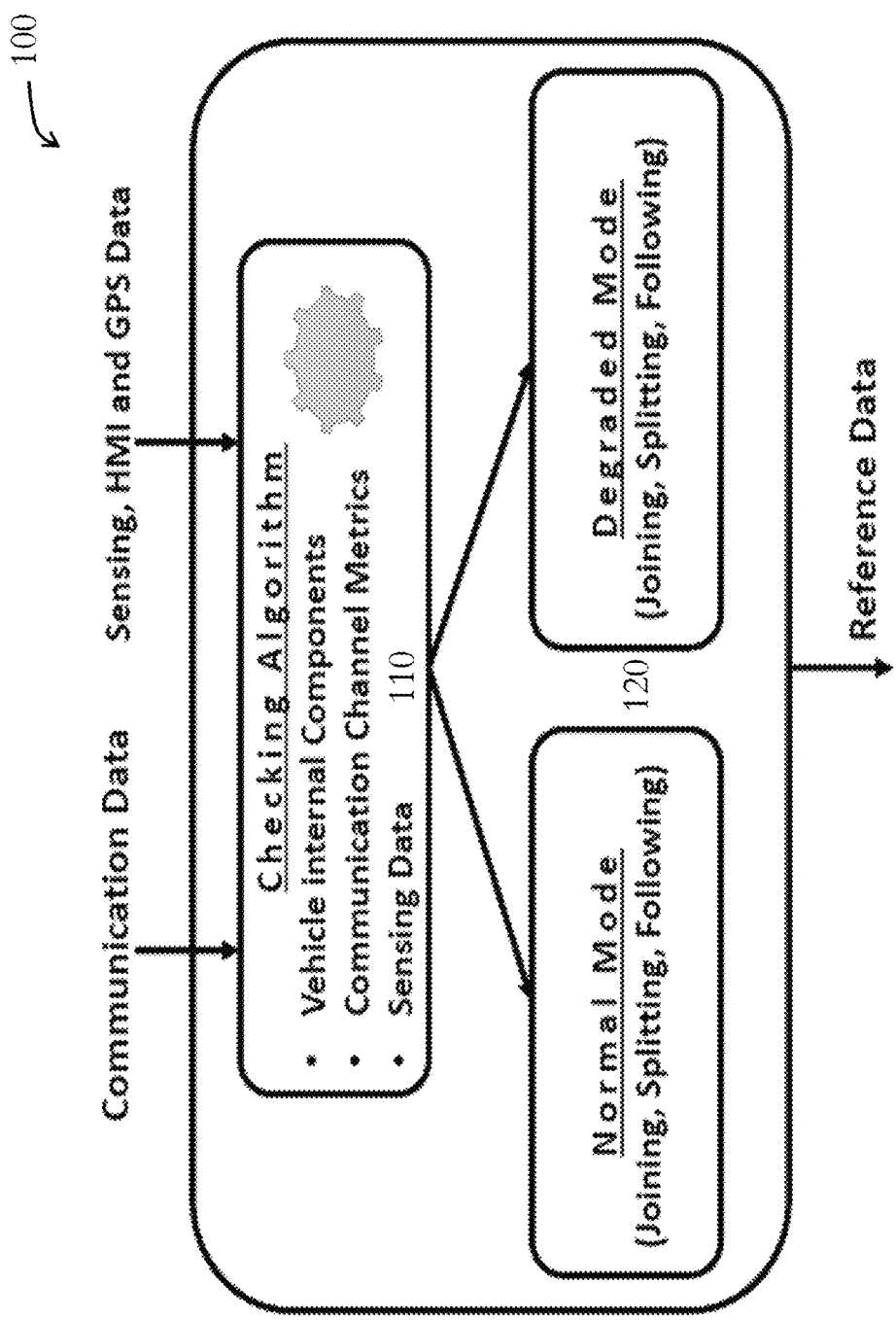
FIG. 1 shows a flow diagram illustrating a method for operating a follower vehicle in a vehicle platoon in accordance with one embodiment of the present invention.

Referring to FIG. 1, there is provided a method 100 for operating a follower vehicle in a vehicle platoon, comprising the steps of 110: determining, during operation, whether the follower vehicle is operating in a normal state or an abnormal state based on an operation condition of a component of the follower vehicle, or a communication between the follower vehicle and a preceding vehicle in the vehicle platoon; and 120: selecting a first control mode if the follower vehicle is in the normal state and a second control mode if the follower vehicle is in the abnormal state (also referred to below as the "degraded state") so as to control movement of the follower vehicle using the selected control mode; wherein in the first control mode, the follower vehicle uses communication data received from the preceding vehicle in the vehicle platoon to control its movement; and in the second control mode, the follower vehicle uses data obtained by one or more of its sensors to control its movement.

In one embodiment, prior to step 110, the method includes receiving a signal indicative of the operation condition of the component or a communication signal transmitted from the preceding vehicle.

Preferably, the follower vehicle is determined to be operating in the abnormal state in step 110 when the component of the follower vehicle is determined to have abnormal operating condition; or the communication between the follower vehicle and the preceding vehicle is determined to have lost or have a quality below a threshold. In step 110, the determination of whether the follower vehicle is operating in a normal state or an abnormal state may be based on both the operation condition of the component of the follower vehicle and the communication between the follower vehicle and a preceding vehicle.

In one embodiment, after step 120, the method includes determining, at the follower vehicle, a distance between the follower vehicle and the preceding vehicle and a deviation of the preceding vehicle with respect to the follower vehicle. The method further includes controlling a velocity of the follower vehicle so as to maintain a reference distance between the follower vehicle and the preceding vehicle; and controlling turning of wheels of the follower vehicle so as to enable the follower vehicle to follow the deviation of the preceding vehicle; thereby allowing the follower vehicle to substantially follow a trajectory of the preceding vehicle.

Preferably, in the first control mode, the distance is determined based on differential GPS using the following information: a local coordinate of the follower vehicle; a local orientation of the follower vehicle; and a GPS coordinate and a GPS orientation of the preceding vehicle that are received from the preceding vehicle. In one example, in the first control mode, the deviation is determined using the information for differential GPS and orientation information obtained using a compass at the follower vehicle. In one example, in the second control mode, the distance and the deviation are determined using the one or more sensors of the follower vehicle. Preferably, the one or more sensors are arranged to transmit and receive electromagnetic or acoustic signals for distance and deviation determination.

In a preferred embodiment, the method further includes momentarily switching from the first control mode to the second control mode when the follower vehicle is in the normal state.

In one embodiment, the method further comprises the step of: operating the follower vehicle in a third mode at a predetermined time interval during operation of the follower vehicle, wherein in the third mode, the follower vehicle: determines the distance between the follower vehicle and the preceding vehicle and the deviation of the preceding vehicle with respect to the follower vehicle using the one or more sensors of the follower vehicles as well as based on data communicated from the preceding vehicle; compares a distance and deviation measure determined based on data obtained from the one or more sensors of the follower vehicles with a distance and deviation measure determined based on data communicated from the preceding vehicle; and switches to the second control mode if the comparison result has an difference larger than a predetermined value.

A. Simulation Model

In this section, the Webots simulation model and the follower vehicle operation control model in accordance with one embodiment of the present invention are introduced.

Operation Model

In the present embodiment, there are two categories of behaviours that the controller could switch to: normal and abnormal (degraded) modes. Each vehicle forming the platoon can receive and process two types of data: messages received by communicating with other platoon members or the data collected by its sensors. A configuration is proposed to manipulate the switching between behaviours as shown in FIG. 1. In the normal mode, the communication between vehicles should be good enough for communicating messages between platoon vehicles. Moreover, all components of the system are working as expected and there is no failure in the vehicle mechanism. In the degraded mode, at least one of the components of the platoon vehicle is not behaving as expected or there is a loss of or corrupted communication signal from the preceding vehicle. Thus, in the degraded mode performance degradation should be mitigated. Preferably, in this mode, one or more local sensors are used for longitudinal and lateral control, in place of the communicated data received from a preceding vehicle. In other words, the follower vehicle will rely on its local perception of the surrounding environment. In the present embodiment, the checking algorithms used in the checking sub-unit have the role to decide whether the platoon vehicle relies on communication with other vehicles or uses its sensors for its movements. Having multiple modes could ensure safety from possible failures in the various conditions that may occur in platoons.

As shown in FIG. 1, data are first analysed in the checking sub-unit to decide in which mode the vehicle will operate. When the vehicle chooses its behaviour, the control solution based on the PID controller can improve the subsequent operations by proposing different gain values for the controller parameters. Therefore, the vehicle's dynamics would be managed by the chosen behaviour and the correspondent gains.

Platoon Control Model

Figure 2:
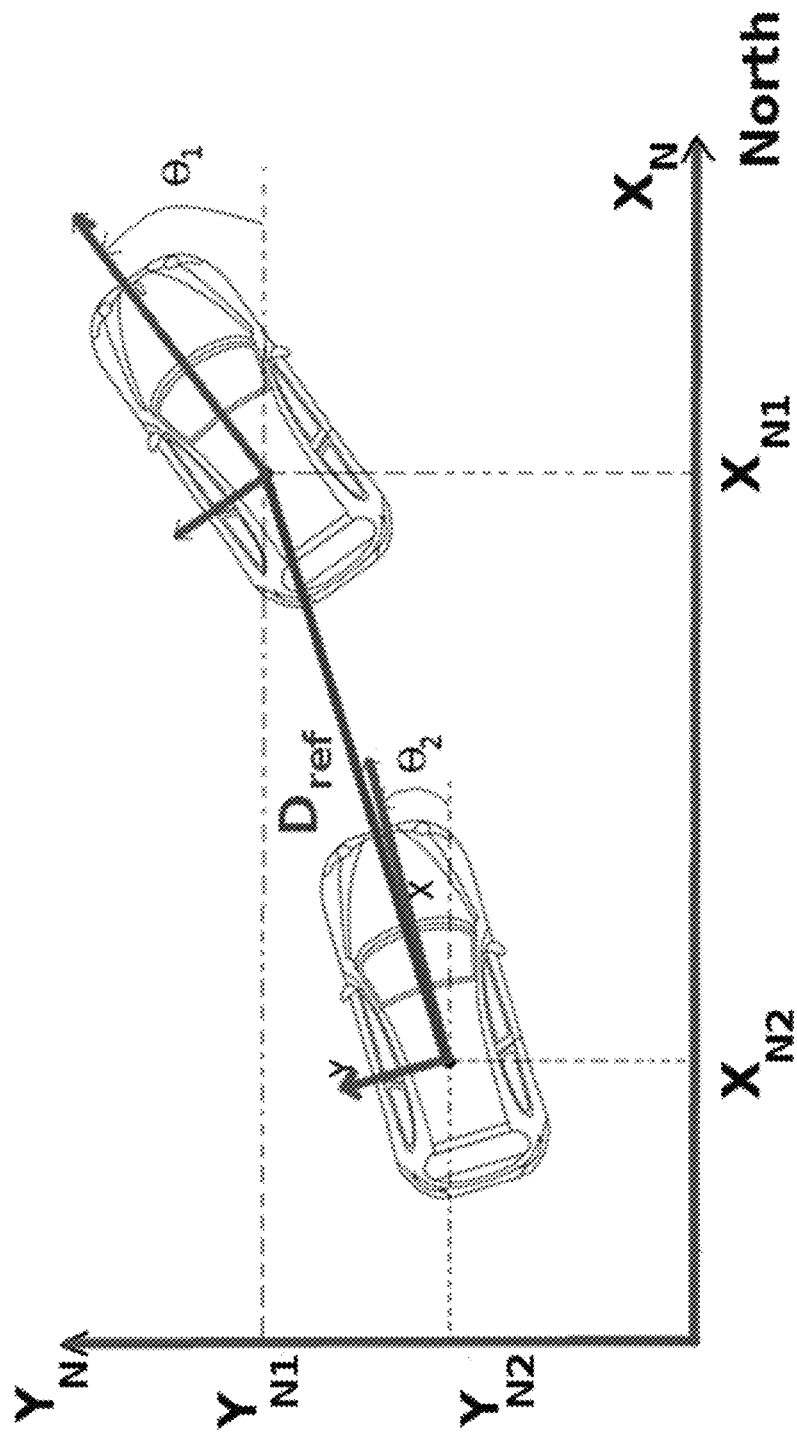
FIG. 2 shows a schematic diagram illustrating the positions of the leading vehicle and the following vehicle, and the inter-distance of the vehicles calculated by GPS.

In this section, the platoon model formalization and the control model are presented. All components of the vehicle considered in the present embodiment are summarized in Table 3. The vehicles in the present exemplary platoon model are cooperating to communicate the required data with the aim of ensuring efficient tracking. A vehicle $V_i$ in the platoon is defined by its position $(X_i; Y_i)$ as shown in FIG. 2. In the present embodiment, GPS may be used to track the movements of the vehicles. Recently, the GPS equipment has been improved in terms of accuracy. An analysis of relative positioning accuracy degradation has shown that GPS could provide centimeter-level relative positioning capability. The communicated data between a vehicle $V_i$ and its preceding vehicle $V_{i-1}$ are: (i) the preceding vehicle coordinates; (ii) the preceding vehicle orientation: $\theta_{i-1}$; (iii) the GPS coordinates of the precedent vehicle; (iv) the GPS coordinates of the vehicle and (v) the inter-distance between two vehicles $D_{i,i+1}$. The GPS accuracy field in Table 3 defines the precision of the GPS (expressed in meters), which is the maximum error in the absolute position. This field will be used in the section of performance evaluation in order to ensure the safety of the platoon. The inter-distance is calculated using the GPS values as follows:

$$D_{i,i-1} = \sqrt[2]{(X_{i+1} - X_i)^2 + (Y_{i+1} - Y_i)^2} \tag{1}$$

In one embodiment, each vehicle may additionally be equipped with a compass. In Webots, a Compass node returns a vector that indicates the direction of the virtual north. Therefore, this equipment is used to determine the vehicle's direction at different iterations. The virtual north is specified by the north Direction field (Table 2). By default, it is set to [1 0 0]. Therefore, the north direction is horizontal and aligned with the x-axis. The vector returned by the compass is the projection of the virtual north in the coordinate system which is restricted to $(X_i; Y_i)$. The direction $\theta_i$ of a vehicle $V_i$ is computed as follows:

$$\theta_i = \operatorname{atan2}\left(\frac{X_{Ni}}{Y_{Ni}}\right) \tag{2}$$

where $X_{Ni}$ and $Y_{Ni}$ are the vehicle positions detected by a compass. The compass may use the coordinate values $(X_i; Y_i)$ detected by the GPS. Each vehicle $V_i$ uses the data collected or received from the preceding vehicle $V_{i-1}$ and applies the proposed control model. This global decentralized approach has the advantage of decreasing the potential role of the leader. When designing an autonomous vehicle, the tracking encompasses two control tasks:

Longitudinal control: it is concerned to the velocity control in order to keep a reference distance $D_{ref}$ to the next vehicle as shown in FIG. 2.

Lateral control: it is concerned with the wheels deviation. A vehicle has to follow the same trajectory as its local leader. For example, in FIG. 2, the following vehicle should apply the same deviation $\theta_1$ when reaching the leading vehicle position.

In the present invention, the same PID controller is adapted for both control tasks. The PID controller is widely used in platoon systems. A PID controller is a feedback control loop used to minimize the error between the controller input value and a set point value.

Longitudinal PID Controller

To apply a longitudinal control, the vehicle uses the distance to the preceding vehicle as an input. For each iteration, the reference distance and the obtained distance are compared and the appropriate acceleration is computed. In the normal mode, the distance is computed using the GPS coordinates obtained by the communication network. When the communication quality is not fully reliable, the vehicle switches to the degraded mode and uses one or more of its sensors to detect the inter-distance. The PID gains are then modified to compensate the sensors inaccuracy. The PID controller output is the acceleration that leads the vehicle to the safety distance. The PID controller equation applied at time t for a vehicle $V_i$ is presented next:

$$u_i(t) = K_p * e_i(t) + k_I * \int e_i(t)dt + k_d * \frac{de_i(t)}{dt} \tag{3}$$

where (i) $u_i(t)$ is the acceleration value of the vehicle $V_i$, (ii) $K_p$, $K_i$, $K_d$ are, respectively, the proportional, integrator and derivative gains constants in both modes, (iii) $e_i(t)$ is the error value at time t with $e_i(t) = D_{i,i-1} - D_{ref}$, (v) $D_{i,i-1}$ is the process variable which is the current distance between $V_i$ and $V_{i-1}$, (iv) $D_{ref}$ is the set point which is the reference distance between two vehicles (limit distance).

Lateral PID Controller

Similar to the longitudinal PID controller, the deviation of the preceding vehicle is obtained through a channel communication in the normal mode and detected with sensors in case of communication degradation. Suppose that the leader $V_{i-1}$ has the $\theta_L$ direction at $t=t_0$. This control is intended to fix the position of the follower in the same direction as the leader. At $t=t_0+\delta t$, the vehicle $V_i$ is changing its direction as follows:

$$\theta_i(t) = PID_{Steer}(\theta_L) \quad (4)$$

where $\delta t$ is the needed time to travel the inter vehicle distance between $V_i$ and $V_{i-1}$, and $PID_{Steer}$ is the control function defined below. The set point is the leader angle at $t-\delta t$ and then the error is the difference between the current follower angle $\theta_F$ and the set point. The $PID_{Steer}$ function is defined as follows:

$$u_i(t) = K_{pl} * e_{il}(t) + k_{il} * \int e_{il}(t)dt + k_{dl} * \frac{de_{il}(t)}{dt} \quad (5)$$

where (i) $e_{il}(t)$ is the error value of the vehicle $V_i$, $e_{il}(t) = \theta_F - \theta_L$, (ii) $\theta_F$ is the process variable which is the vehicle $V_i$ direction at t, (iii) $\theta_L$ is the set point which is the vehicle $V_{i-1}$ direction at $t-\delta t$, (iv) $K_{pl}$, $K_{il}$, $K_{dl}$ are, respectively, the proportional, integral and derivative gain constants.

Tuning of the PID Controller Gains

The process of calculating the optimal gains for the Proportional (P), Integrative (I) and Derivative (D) is called tuning. Since the platoon system is not linear, it would be a rigorous task to determine the different gains which lead to the safety of the platoon in different cases. Hence, the trial and error method is chosen to obtain the PID controller gains and classified them depending on the vehicle's velocity. For example, if the vehicle is running within a speed of 60 km/h or 100 km/h, then two categories of gains would be applied when traveling at those, two velocities.

In this method, the parameters I and D are both set to 0 first and the proportional gain is increased until the output of the loop oscillates. Hence, the system becomes faster and hence it is needed to maintain a stability of the system. To stop the oscillations, the integral term is increased to stop the oscillations and to reduce the steady state error. However, this term increases the overshoot. In the degraded mode, it is found that some amount of overshoot is necessary for a fast system such that it could respond to changes immediately. Once the parameters P and I have been set to get the desired control with minimal steady state error, the derivative term is increased to decrease the overshoots. However, this term is highly sensitive noise and therefore the Derivative Response can make the control system unstable. For this reason, small values for this term have been chosen.

Figure 3:
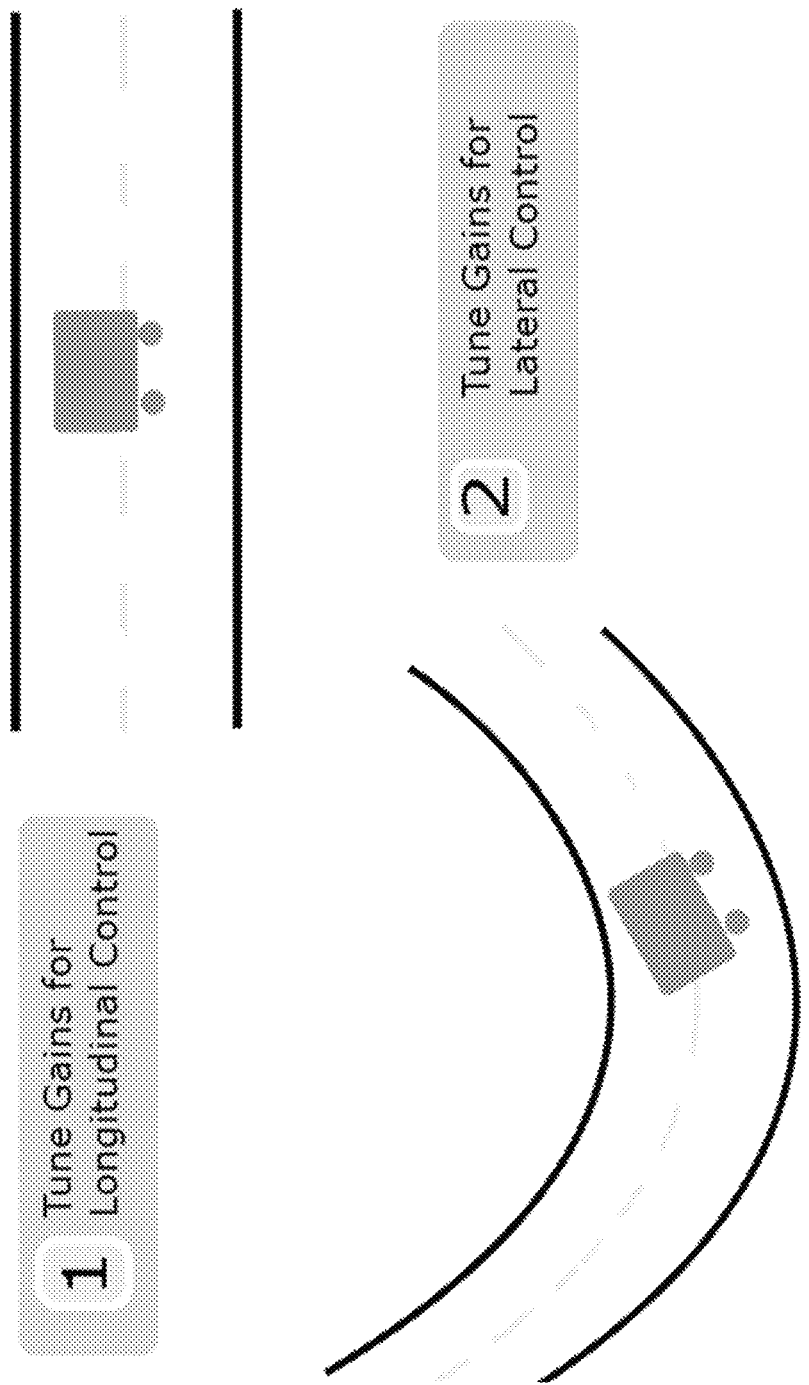
FIG. 3 shows a schematic diagram illustrating the tuning of the gains for longitudinal control and lateral control.

Since there are two types of gains for each mode, the gains for longitudinal control are first tuned and then the gains for the lateral control are determined, as shown in FIG. 3. To tune the longitudinal control gains, the platoon vehicles are aligned in the same line and are moved in a straight line. The steering is omitted for all vehicles and therefore, the lateral control is not as important since all vehicles are aligned in the same lane and are supposed to move in a straight direction. Once the parameters P, I and D are determined for the first type of control, the platoon is moved in different directions to determine the gains for the lateral control. The various values of gains are presented in Table 1.

TABLE 1

The tuned gains for the PID controller

| | Speed range (km/h) | Tuned gains |
|---|---|---|
| Normal mode | [0-80] | $K_p$ = 2.0, $K_i$ = 0.005, $K_d$ = 2.0 |
| | | $K_{pl}$ = 0.7, $K_{il}$ = 0.006, $K_{dl}$ = 0.0 |
| | [80-130] | $K_p$ = 2.0, $K_i$ = 0.005, $K_d$ = 2.0 |
| | | $K_{pl}$ = 0.7, $K_{il}$ = 0.06, $K_{dl}$ = 0.5 |
| Degraded mode | [0-80] | $K_p$ = 0.7, $K_i$ = 0.005, $K_d$ = 1.0 |
| | | $K_{pl}$ = 0.8, $K_{il}$ = 0.008, $K_{dl}$ = 0.0 |
| | [80-130] | $K_p$ = 0.1, $K_i$ = 0.005, $K_d$ = 2.0 |
| | | $K_{pl}$ = 0.7, $K_{il}$ = 0.1, $K_{dl}$ = 0.0 |

Webots Simulation Model

Figure 4:
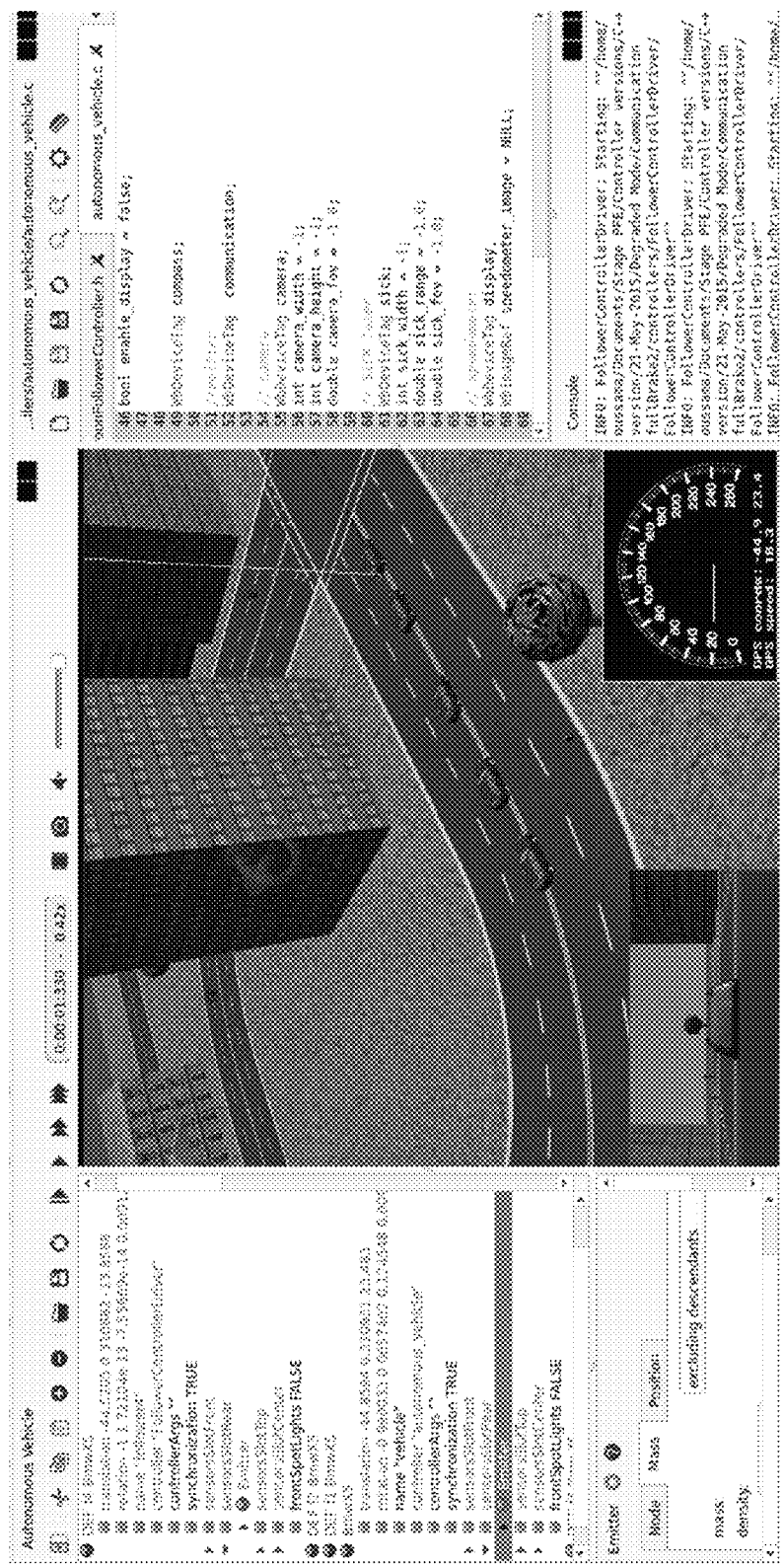
FIG. 4 shows a Simulation Environment for the modelling of vehicles in a vehicle platoon.

In the Webots environment, a large choice of simulated sensors and actuators are available to equip each vehicle in the platoon. In order to obtain realistic results, a 3D model of the BMW X5 is used. The vehicle is modelled with realistic physics properties: motor torques; body mass; friction force; suspension; etc. Its characteristics are as indicated in Table 2 and the simulation environment is as shown in FIG. 4. The dynamic aspects of the vehicle in Webots are very similar to the vehicle in the real world. Thus, this can reduce the complexity of the platoon system and hence improve accuracy of simulation results.

TABLE 2

The BMW X5 parameters

| Parameters | Values | Definitions |
|---|---|---|
| TrackFront | 1.628 | Defines the front distances between right and left wheels in meters |
| TrackRear | 1.628 | Defines the rear distances between right and left wheels in meters |
| WheelBase | 2.995 | Defines the distance between the front and the rear wheels axes in meters |
| BrakeCoefficient | 500 | Defines the maximum dampingConstant applied by the brake on the wheels joint (Ns/m) |
| EngineMaxTorque | 250 | Defines the maximum torque of the motor in Nm |
| EngineMinRPM | 1000 | Defines the working range of the engine |
| EngineMaxRPM | 4500 | Defines the working range of the engine |
| engineMaxPower | 50000 | Defines the maximum power of the motor in W |
| MinSteeringAngle | −1 | Defines the minimum steering angle of the front wheels |

TABLE 2-continued

The BMW X5 parameters

| Parameters | Values | Definitions |
|---|---|---|
| MaxSteeringAngle | 1 | Defines the maximum steering angle of the front wheel |
| time0To100 | 10 | Defines the time to accelerate from 0 to 100 km/h |
| suspensionRearSpringConstant | 100000 | suspension |
| suspensionFrontDampingConstant | 4000 | suspension |
| suspensionRearSpringConstant | 100000 | suspension |
| suspensionRearDampingConstant | 4000 | suspension |
| wheelsDampingConstant | 5 | Defines the dampingConstant of each wheel joint |
| extensionSlot | NULL | Extension slot allowing the user to add other node |
| boundingObject | NULL | Physical geometry of the vehicle |
| physics | NULL | Physics node of the vehicle defining the physical parameters of the vehicle |

There are three main steps to simulate a controller. First of all, the WorldInfo node is configured in the scene tree. The WorldInfo node has general information about the simulated world as indicated in Table 3. Some Webots parameters, structures or concepts refer to ODE, the Open Dynamics Engine, for physics simulation. The basicTimeStep field defines the duration of the simulation step executed by Webots. This value is tuned in order to find a suitable speed-accuracy trade-off. The FPS (frame per second) is useful to limit the refresh rate in order to speed up simulations that have small basicTimeStep value. The CFM field defines the Constraint Force Mixing used by ODE to manage contacts joints. The CFM field defines the Constraint Force Mixing used by ODE to manage contacts joints. The ERP field defines the Error Reduction Parameter used by ODE to manage contacts joints. It specifies what proportion of the contact joint error will be fixed during the next simulation step. Then, the code of the designed controller is developed in C++. A person skilled in the art would appreciate that other programming language may be used.

TABLE 3

WorldInfo parameters

| Environment parameters | Values |
|---|---|
| title | "Platoon System" |
| gravity | 0-9.810 |
| CFM | 500 |
| ERP | 0.6 |
| fast2d | " |
| physics | " |
| basicTimeStep | 10 ms |
| FPS | 60 (frames per second) |
| physicsDisableTime | 1 s |
| physicsDisableLinearThreshold | 0.01 m/s |
| physicsDisableAngularThreshold | 0.01 rad/s |
| defaultDamping | NULL |
| inkEvaporation | 0 |
| northDirection | 1 0 0 |
| linescale | 1 m |

Figure 5:
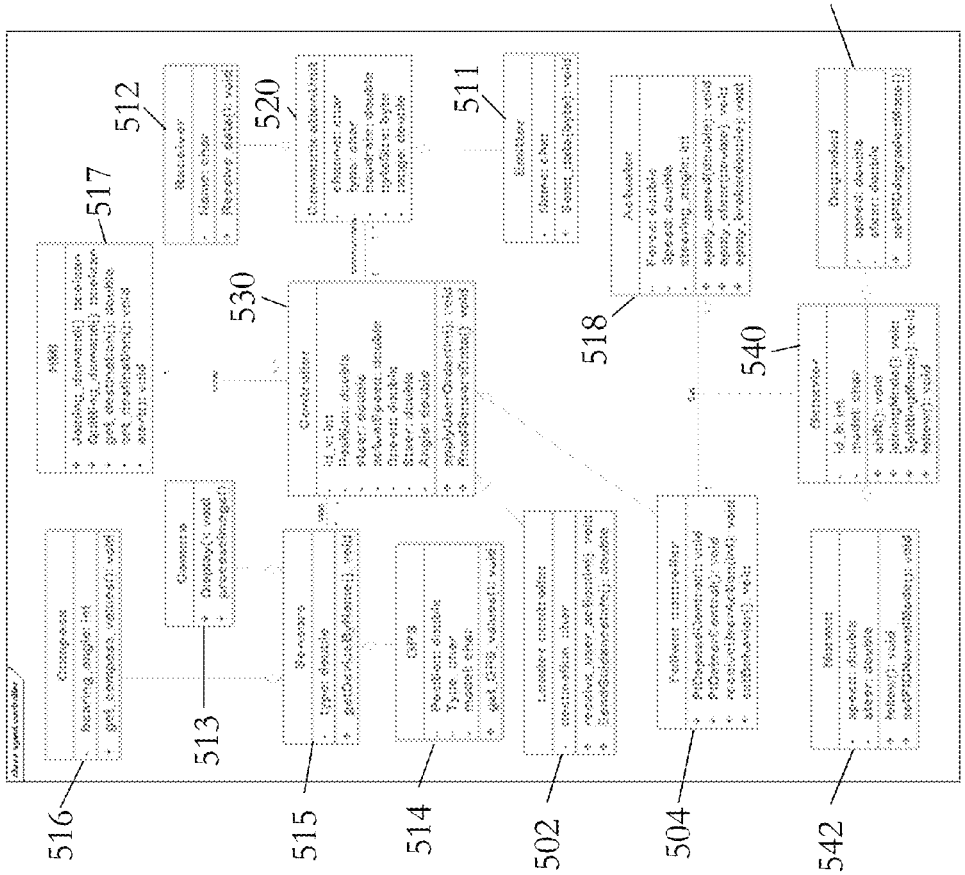
FIG. 5 shows a Class diagram illustrating the classes developed for the vehicles in the vehicle platoon.

In FIG. 5, two types of classes are developed for vehicles: a leader vehicle and one or more followers vehicles. The leader vehicle could be driven manually and has a leader class 502. The follower class 504 will be attached with each platooning/follower vehicle. Each component of the vehicle, such as the emitter 511, receiver 512, camera 513, GPS 514, sensor 515, compass 516, HMI 517 and actuator 518 etc., is defined in this class. Hence, each vehicle will be able to get different control data using predefined functions in Webots by reading its sensors 515. The movements of the vehicle such as accelerating, steering and braking can also be controlled by applying suitable values to their actuators 518.

The designed controller 530 exhibits a new model of controlling a system by differentiating the behaviours 540 and creating a network of vehicles in which they communicate to realize the following process. Two types of behaviours 540 are developed: normal 542 and degraded 544. Following vehicles have the ability to apply values on their actuators 518 based on the type of behaviour 542 or 544 they choose. Receiving and sending messages is achieved by the communicationUnit class 520. However, in the degraded mode 544, vehicles use the data received from their sensors 515 to avoid the collision and loosing the right direction. Indeed, this modification of behaviour 542 or 544 is due to the detection of some faults at vehicle's actuators 518 or due to a long delay when receiving data from the preceding vehicle. Obviously, it would be safer to rely on sensors 515 than waiting for leader messages.

Performance Evaluation

In this section, a comprehensive simulation study of the vehicular platoon using the proposed Webots simulator is presented to evaluate the performance of the longitudinal and lateral controllers. In particular, the following focuses on the safety of the platoon and the robustness of the controllers for all cases. The following also shows the advantages of partitioning the vehicle's behaviours into two different modes by comparing the obtained results of the normal and degraded mode.

Simulation Settings and Parameters

The proposed platoon considered in the present invention is composed of five identical vehicles BMWX5. Table 4 presents the characteristics of the vehicle model.

TABLE 4

Vehicle's equipment

| Positions | Names | Parameters | |
|---|---|---|---|
| Sensors Slot Rear | SickLMS291 | Noise | 0 |
| | | Resolution | 180 |
| | | pixelSize | 4 |
| Sensors Slot Rear | Emitter | Channel | 1 |
| | | type | "infra-red" |
| | | range | 30 |
| | | baudRate | −1 |
| | | byteSize | 8 |

TABLE 4-continued

Vehicle's equipment

| Positions | Names | Parameters | |
|---|---|---|---|
| | | bufferSize | −1 |
| | | signalStrengthNoise | 0 |
| | | directionNoise | 0 |
| Sensors Slot Top | Receiver | Channel | 1 |
| | | type | "infra-red" |
| | | range | 30 |
| | | baudRate | −1 |
| | | byteSize | 8 |
| | | bufferSize | −1 |
| | | signalStrengthNoise | 0 |
| | | directionNoise | 0 |
| | | Camera | |
| Sensors Slot Center | GPS | type | Satellite |
| | Compass | Accuracy | 0 |
| | Gyro | resolution | −1 |
| | Display | xAxis | TRUE |
| | | yAxis TRUE | TRUE |
| | | zAxis TRUE | TRUE |

Controller Convergence

In this section, the performance of the longitudinal and lateral controllers presented in equations (3) and (5) are evaluated in terms of convergence and stability. The reference distance is set to 7 meters for a vehicle with a speed close to 80 km/h.

Obviously, some data are needed to calculate the new acceleration and get the desired distance at that speed such as the position and the direction of the leader. The PID controller's gains for this scenario are set as follows:

$K_p = 2.0$, $K_i = 0.005$, $K_d = 2.0$ $K_{pl} = 0.7$, $K_{il} = 0.006$, $K_{dl} = 0.0$ (6)

Figure 6:
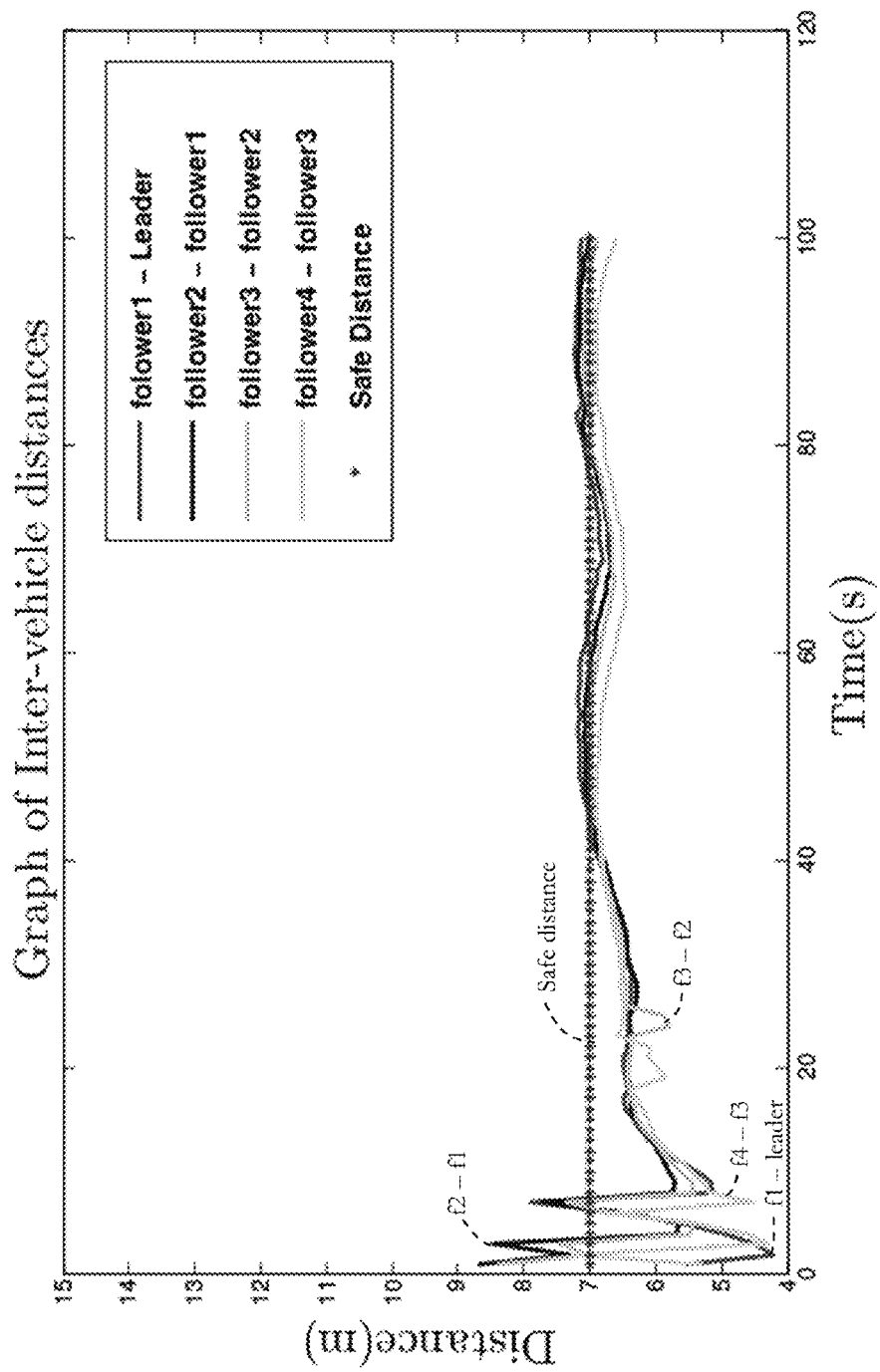
FIG. 6 shows the graph of the inter-vehicle distances against time when the vehicles are in the normal mode (normal state)

FIG. 6 plots the results for the inter-vehicle distances in the normal mode. Distances start with some oscillations in the range of [5-9] meters in the first 10 seconds and then they quickly converge 20 seconds later to the target inter-vehicle distance of 7 meters for vehicle's speed of 80 Km/h. It is noted that the inter-vehicle distances gradually and smoothly converge to the safety distance. In addition, it is observed that distances are bounded between 6.5 and 7.2 meters, which represent an acceptable confidence interval for the mean value of 7 meters. Hence, a medium fastness of response is obtained and the stable convergence characteristic was satisfied.

Figure 7:
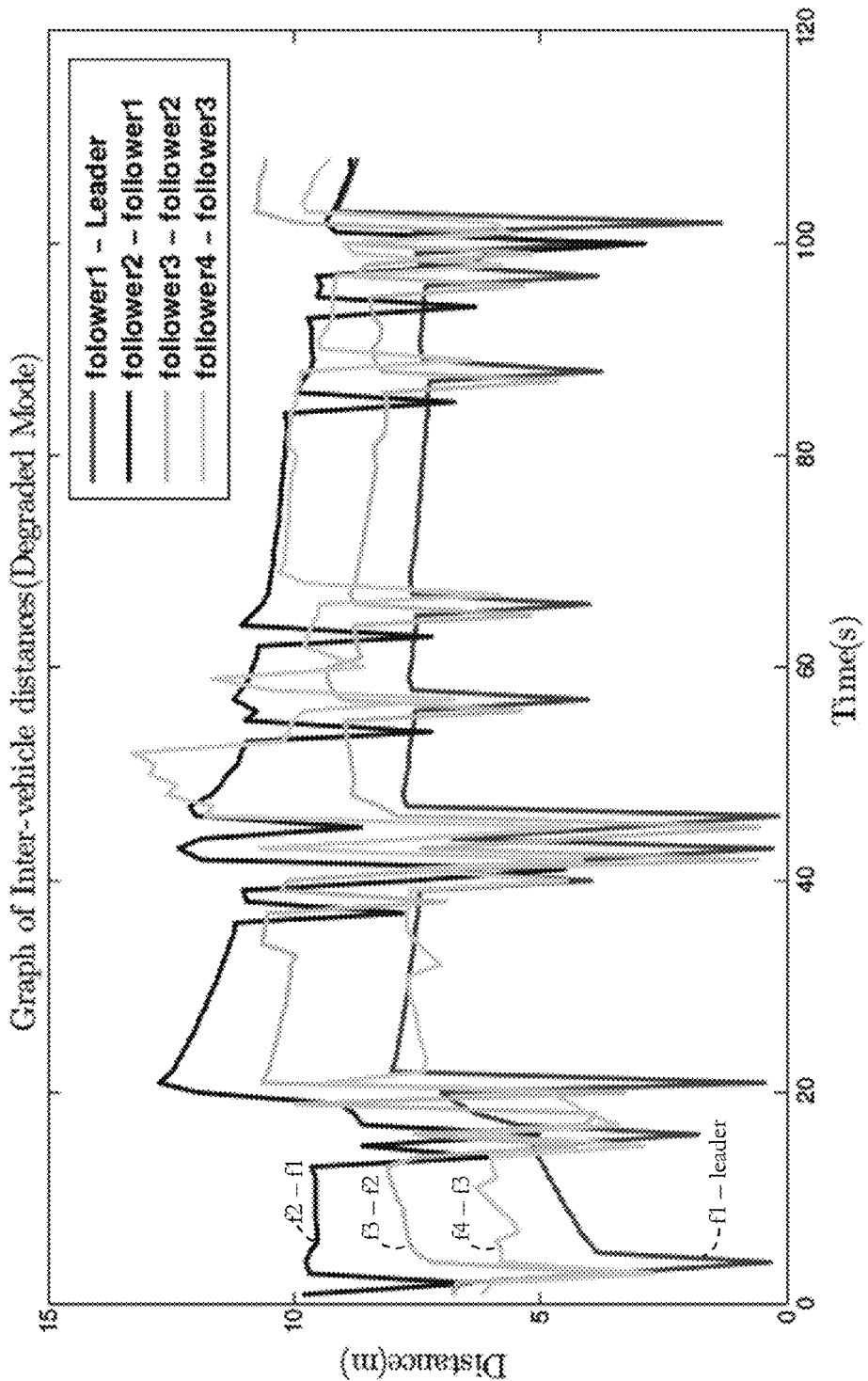
FIG. 7 shows the graph of the inter-vehicle distances against time when the vehicles are in the degraded mode (abnormal state)

In FIG. 7 results for the inter-vehicle distances in the degraded mode are shown. During this simulation, the leading vehicle accelerates/decelerates at different times within a maximum speed of 80 km/h. it can be seen that there are many oscillations. At t=18, 40, 98 s, three intentional harsh braking actions are performed and then the leading vehicle accelerates again. As the preceding vehicles are braking and accelerating at these moments, there is a sharp decrease and increase of distances. It can be seen that no collision occurs when the vehicles approach each other. In addition, when the following vehicles accelerate, they can set the vehicle at the exact desired distance.

Compared to the normal mode, the degraded mode has shown its efficiency on its fast response to deal with motion changes of the system. This is due to the small delay it takes to obtain the information from its sensors which is, obviously, shorter than the delay needed to receive the information by communication.

For all cases, the controllers are robust to such factors as acceleration/deceleration of the lead vehicle. In addition, follower vehicles are shown to be able to avoid collision when a harsh brake is performed by the preceding vehicle. An advantage of the platoon is shown by this experiment which is the small distance the controllers succeed to maintain (7-8 meters) within a speed of 80 km/h. However, the adopted safety distance is not accepted when vehicles are manually driven.

Impact of an Operating Mode

The impact of normal and degraded modes on the platoon behaviour and performance is investigated. In order to switch to a degraded mode, one kind of failure should be present. Considering a delay of the communication, controllers would not find the reference values to apply to the longitudinal and lateral control. Therefore, it has been considered that the delay of receiving the information from the preceding vehicle due to packet loss is one reason to switch to the degraded mode. Since three are have two possible outcomes ("success" or "failure") for receiving a message, this situation can be modelled by the Bernoulli distribution with a probability of packet loss equal to 20%. This means that, in average, only 80% of the packets are correctly exchanged between two vehicles.

First, the impact of the operating mode on the trajectory matching between a follower and the leader is evaluated. The speed of the leader vehicle could reach 100 km/h. The gains for the longitudinal controller and the lateral controller are shown in Tables 5 and 6, respectively. The gains of longitudinal and lateral control predefined previously would be applied automatically according to the new speed of the leading vehicle.

TABLE 5

PID controller gains of speed

| Speed = [80, 100] km/h | Normal Mode | Degraded Mode |
|---|---|---|
| $K_p$ | 2.0 | 1.0 |
| $K_i$ | 0.005 | 0.035 |
| $K_d$ | 2.0 | 1.0 |

TABLE 6

PID controller gains of steering

| Speed = [80, 100] km/h | Normal Mode | Degraded Mode |
|---|---|---|
| $K_{pl}$ | 2.0 | 0.7 |
| $K_{il}$ | 0.005 | 0.1 |
| $K_{dl}$ | 1.0 | 0.0 |

Figure 8:
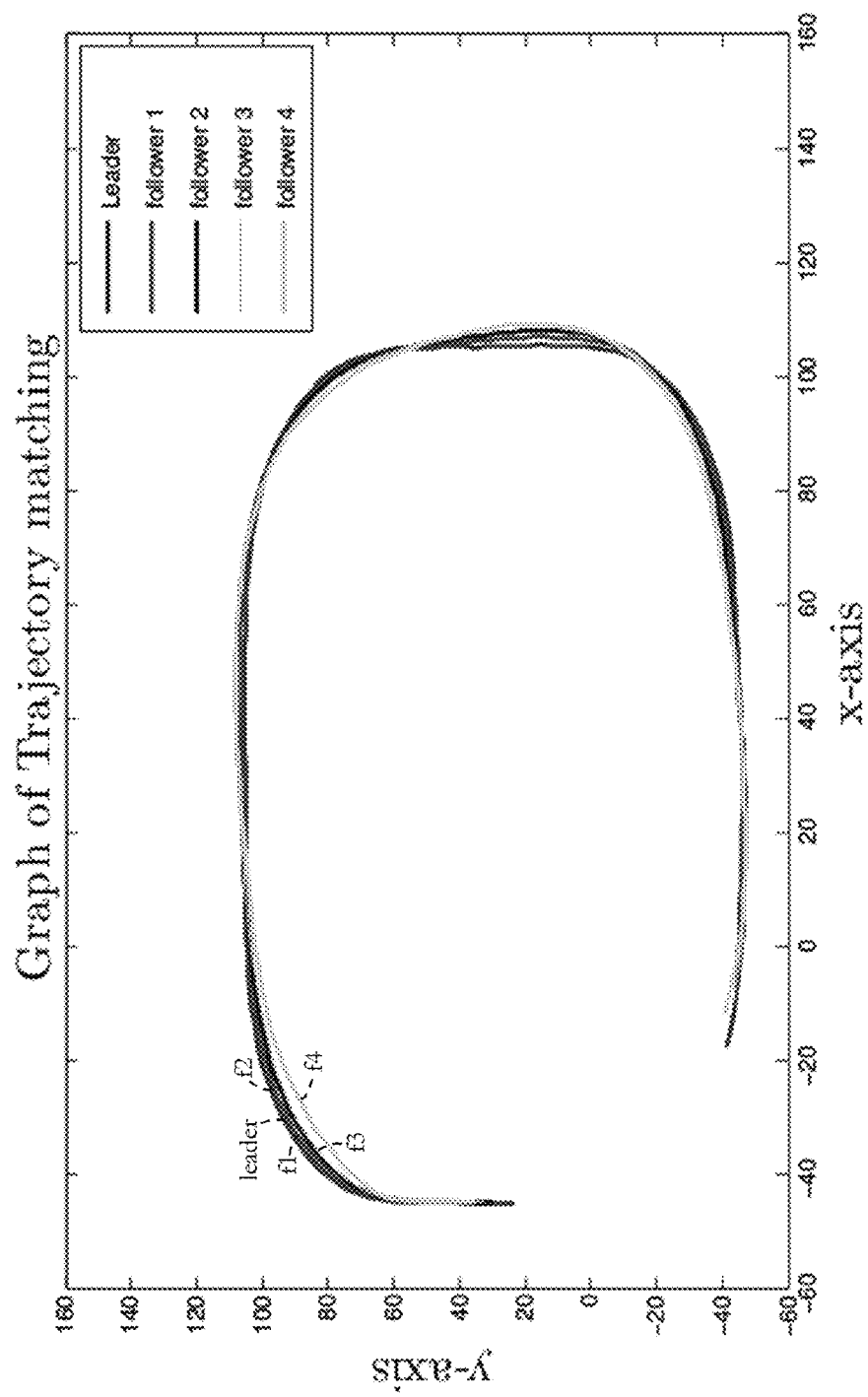
FIG. 8 shows the trajectories matching of the leader and follower vehicles in the normal mode.
Figure 9:
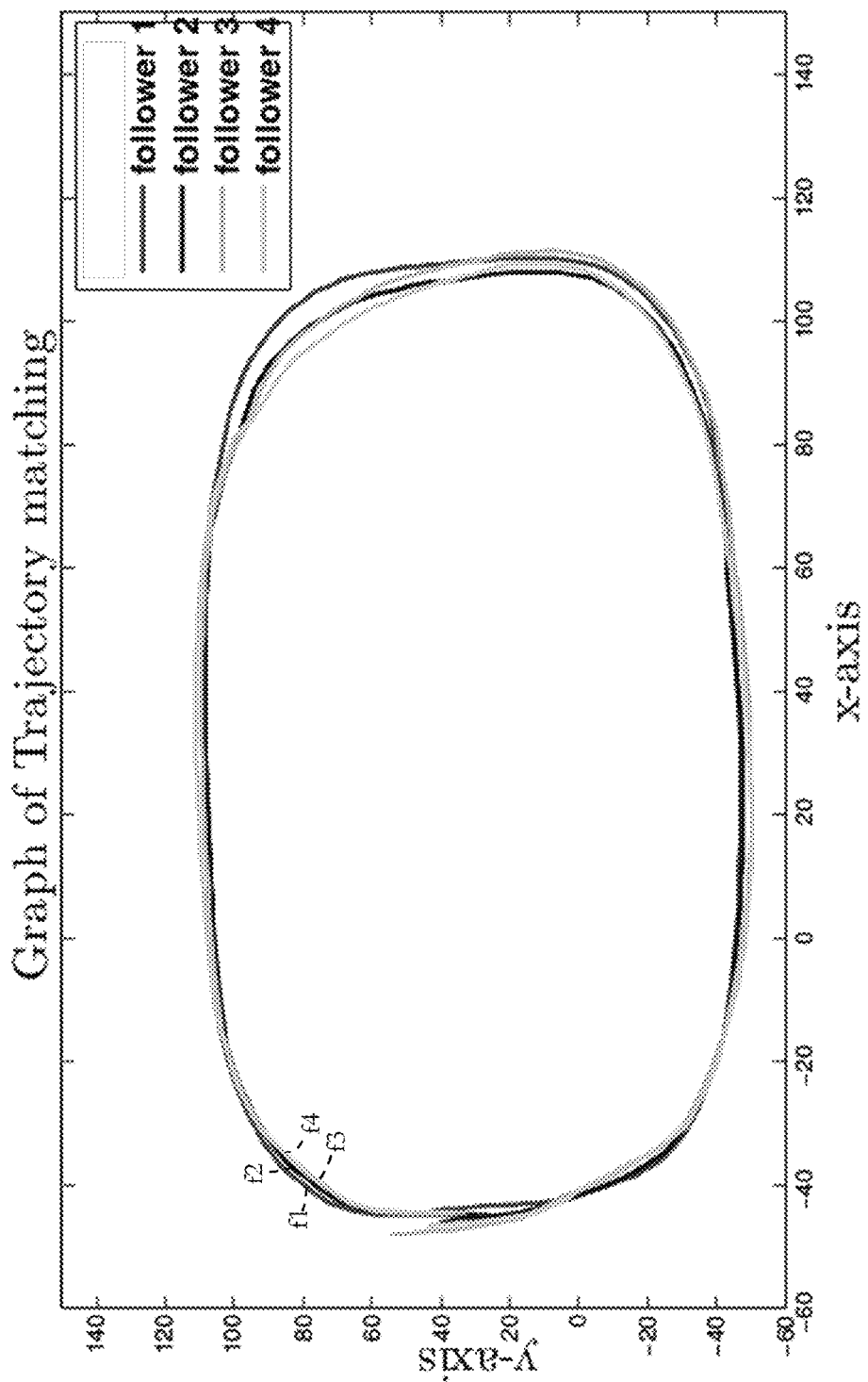
FIG. 9 shows the trajectories matching of the leader and follower vehicles in the degraded mode.

In FIG. 8, it is observed that in the normal mode, the trajectory of the followers matches to a good extent that of the leader within a range of [96%, 100%]. The discrepancy between trajectories is small in the normal mode. However, as shown in FIG. 9, the degraded mode exhibits a gracefully degraded trajectory matching in the range [95%, 99%] in straight lines and [93%, 96%] in turning trajectories. This illustrates the impact of packet losses on the quality of trajectory matching, but still confirms that the controllers are robust and immune against these communication perturbations as long as the perturbation is reasonably low (in this case 20% of packet losses).

Figure 10:
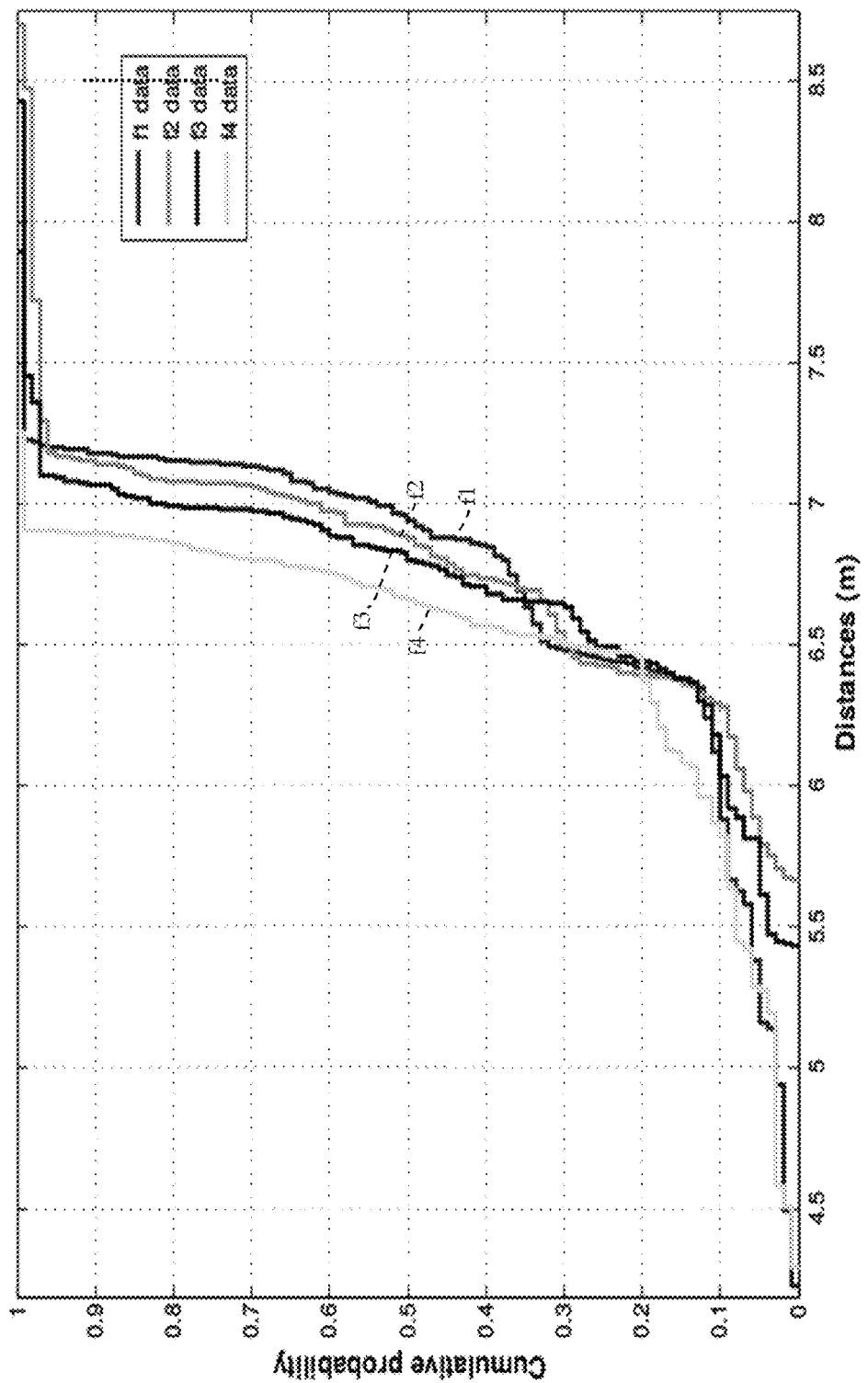
FIG. 10 shows the cumulative distribution probability of the distances when the follower vehicles are in the normal mode.
Figure 11:
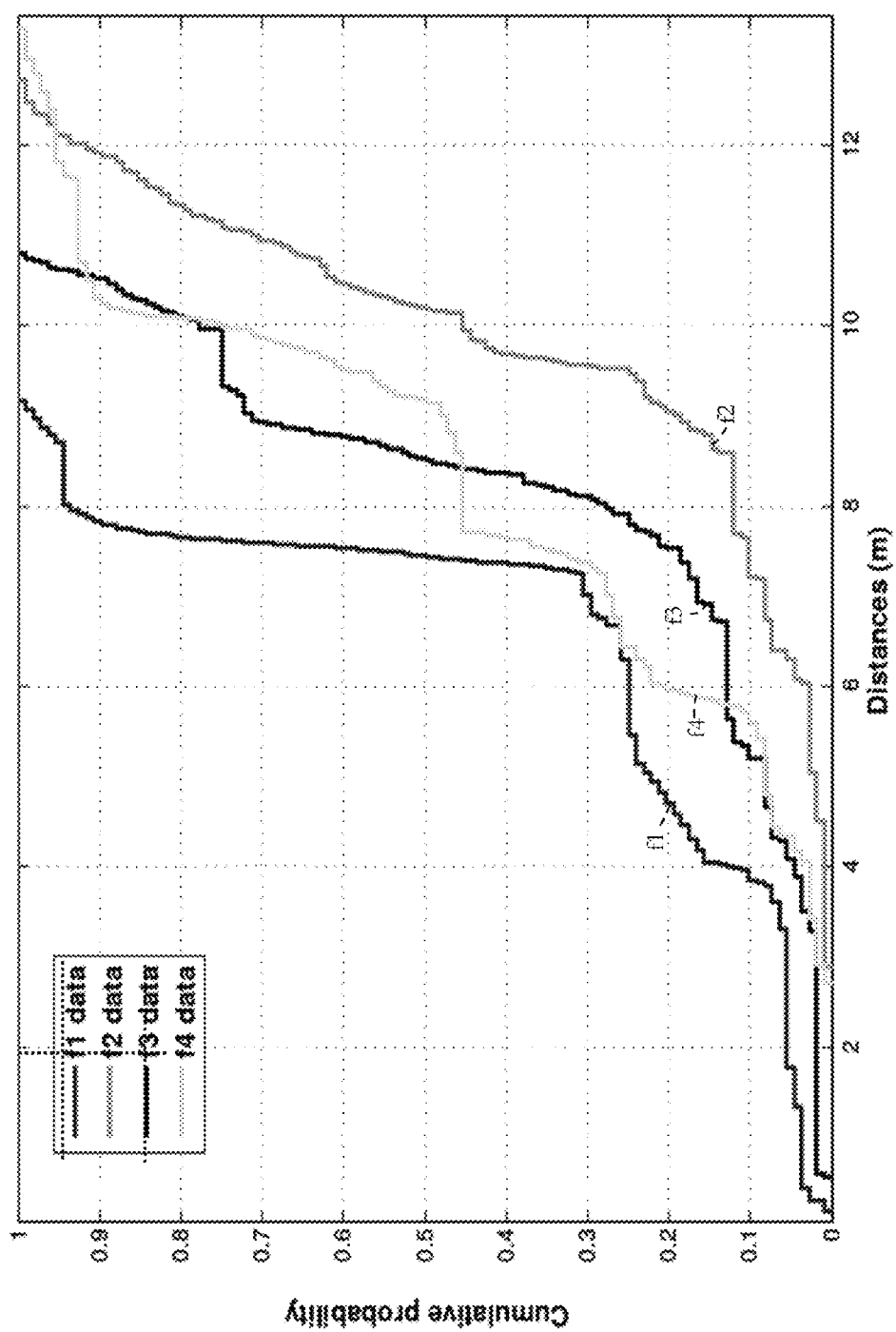
FIG. 11 shows the cumulative distribution probability of the distances when the follower vehicles are in the degraded mode.

The distance distributions are also evaluated. FIGS. 10 and 11 depict the cumulative distribution function (CDF) of the distances for both control modes. It has been observed that the CDF of distance in the normal mode is more consistent among all vehicles as compared to the degraded mode. In fact, in the normal mode, all the vehicles maintain a safety distance in the range [6 m-8 m] in 90% of cases, whereas in the degraded mode it is more dependent on the order of the vehicle in the platoon. In the degraded mode, the first follower maintains a safety distance in the range [6 m-8 m] in 70% (between 25% to around 95%) of cases, whereas the second follower maintains a safety distance in the range [6 m-8 m] in 10% of cases, for the third follower in 15% of cases, and for the fourth follower in 25% of cases. These discrepancies are due to the impact of packet losses on the tracking of the safety distance around 7 meters.

For the sake of precision, the cumulative probabilities of distances for the following vehicles in both modes are calculated in the table below. It clearly shows the difference between the normal and degraded modes in the term of estimated safe distances. e.g., 74% of the distances are estimated for the third follower in the normal mode with a distance less than 7 meters whereas 26% of distances are estimated for the same follower in the degraded mode. Overall, the distances accuracy can be assumed to be acceptable in both the normal and degraded modes. In addition, two observations can be deduced. First, the degraded mode provides smaller inter-vehicle distances. Second, the normal mode is more efficient in encompassing an estimated distance.

TABLE 7

Evaluation of the cumulative distribution function of distances in normal and degraded modes

| Normal Mode | | | Degraded Mode | | |
| --- | --- | --- | --- | --- | --- |
| Follower 1 | 6.5 | 0.36046 | Follower 1 | 6.5 | 0.48595 |
| | 7 | 0.67509 | | 7 | 0.5854 |
| | 7.5 | 0.89711 | | 7.5 | 0.67963 |
| Follower 2 | 6.5 | 0.36046 | Follower 2 | 6.5 | 0.02579 |
| | 7 | 0.657509 | | 7 | 0.04802 |
| | 7.5 | 0.89711 | | 7.5 | 0.08346 |
| Follower 3 | 6.5 | 0.32581 | Follower 3 | 6.5 | 0.18985 |
| | 7 | 0.74432 | | 7 | 0.26417 |
| | 7.5 | 0.96122 | | 7.5 | 0.351 |
| Follower 4 | 6.5 | 0.50071 | Follower 4 | 6.5 | 0.2075 |
| | 7 | 0.82496 | | 7 | 0.27581 |
| | 7.5 | 0.96905 | | 7.5 | 0.35362 |

Impact of Speed

The impact of the speed on the platoon is investigated. The behaviour of the platoon when running in high and low speed is first studied. Then, the response of the platoon to emergency situations such as a full braking performed by the leading vehicle is studied.

Low and High Speed

Figure 12:
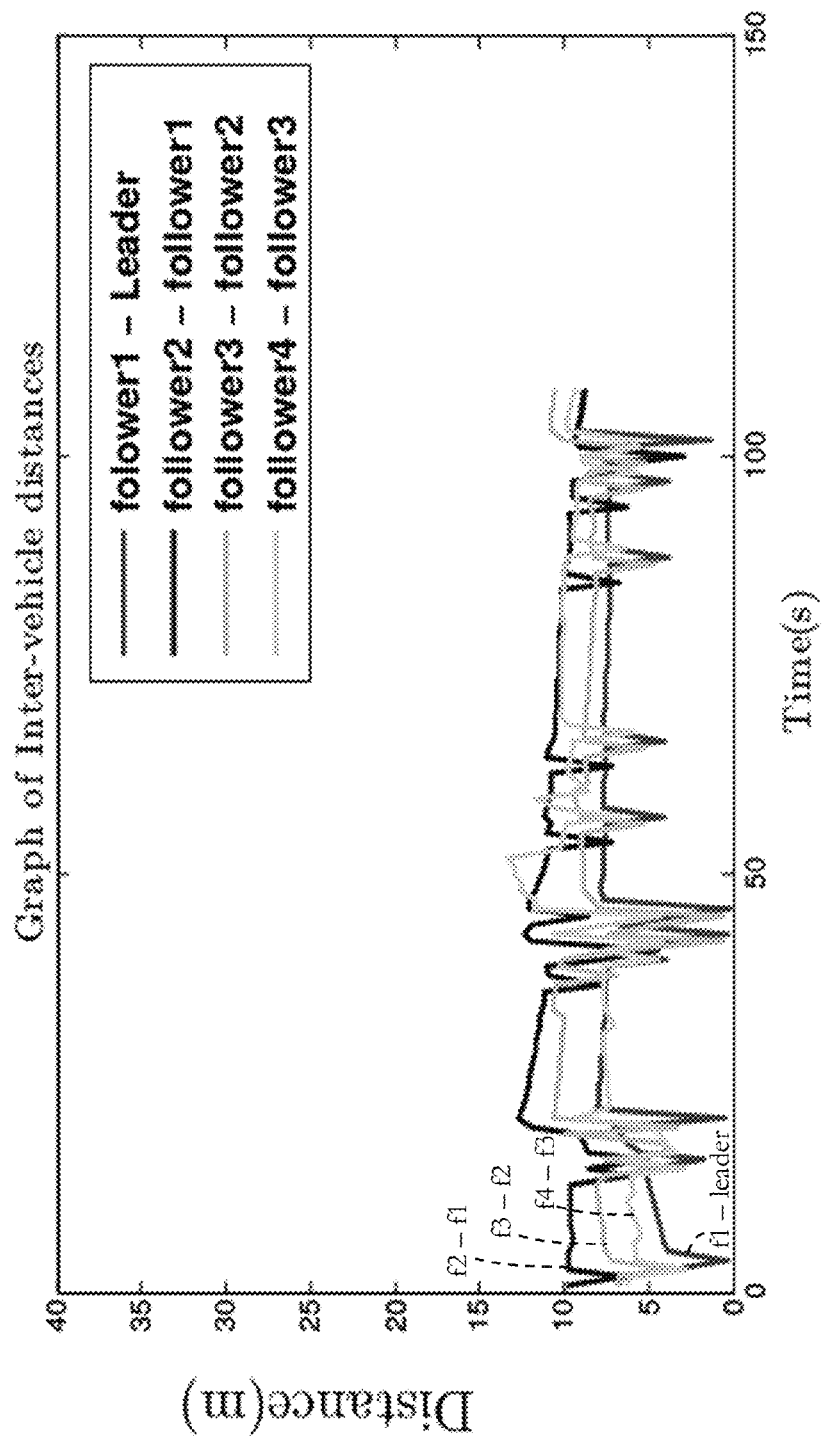
FIG. 12 shows the graph of the inter-vehicle distances against time when the vehicles are in low speeds and in the normal mode.

In this subsection, the impact of the speed on the platoon behaviour is assessed. FIG. 12 shows the simulated results for the inter-vehicle distances in low speed. Setting the maximum speed to 70 km/h. Observe that the inter-vehicle distance is in the range of [5-10] meters, with some oscillations at time instants t={20, 22, 41, 43 . . . }. These are due to the braking performed by the leading vehicle. In fact, there is no collision during this simulation and the safety distance is maintained. In addition, a small spacing between vehicles is obtained. This shows the effectiveness of the designed controller.

Figure 13:
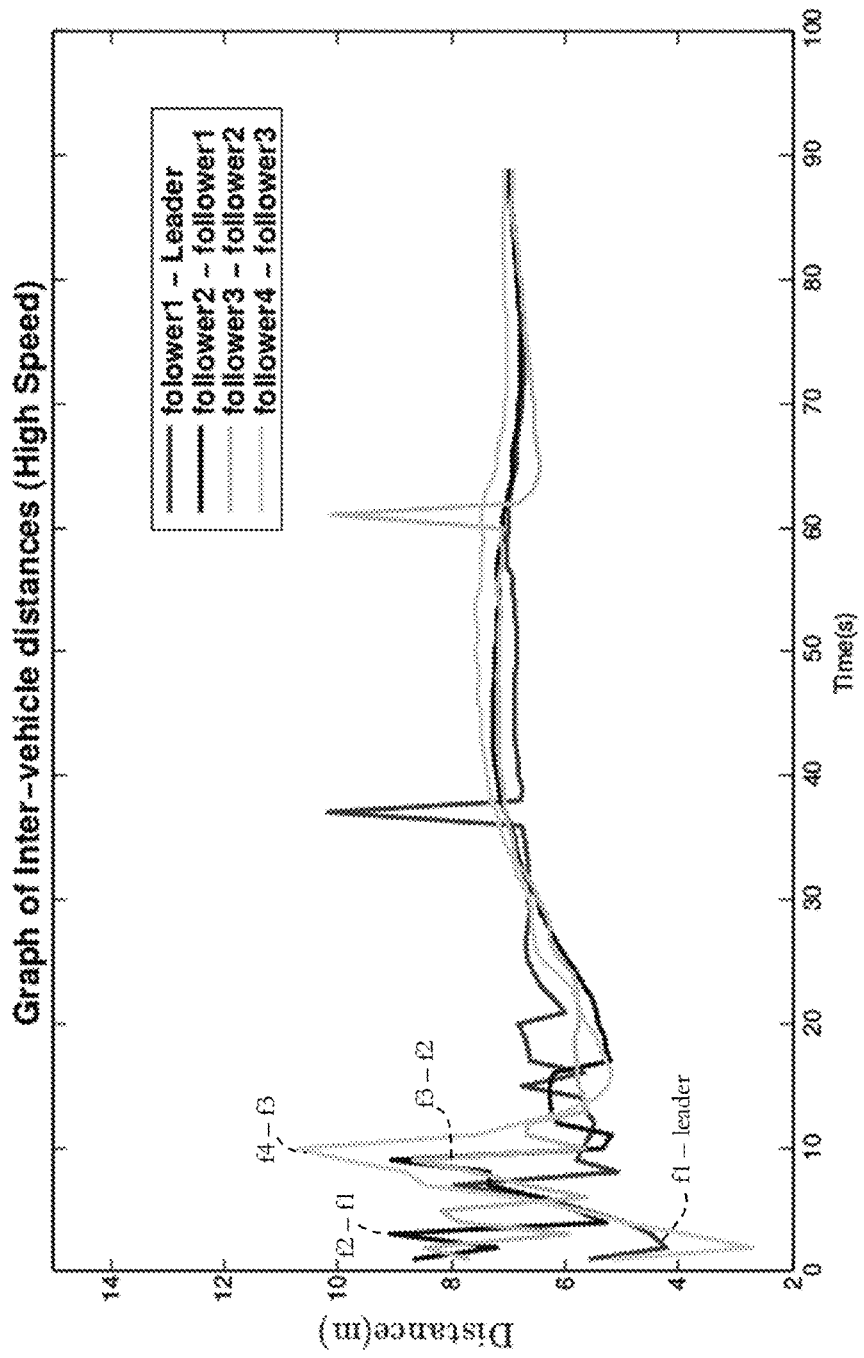
FIG. 13 shows the graph of the inter-vehicle distances against time when the vehicles are in high speeds and in the normal mode.

In FIG. 13, the behaviour at high speed is studied. The maximum speed is set to 100 km/h. It is noted that there are some fluctuations of distances at t=[0, 20] for all platoon vehicles due to the acceleration and deceleration of the leading vehicle. After t=20s, a steady state velocity is used for the leading vehicle. Therefore, it can be seen that the spacing between vehicles remains in a small interval [6, 8] meters. However, for t=38 s and t=68 s, the first and the third followers reach a peak during this period. This may be due to communication errors or also due to the environment infrastructure. However, it does not affect the performance of the platoon and vehicles are able to rapidly maintain the previous distance. Compared to low speeds (FIG. 12), the result shows that the range of the inter-vehicle distances does not change so much. In fact, at high speed the safety distance should be increased to keep the platoon safe. Also, there is no collision between the platoon vehicles.

Figure 14:
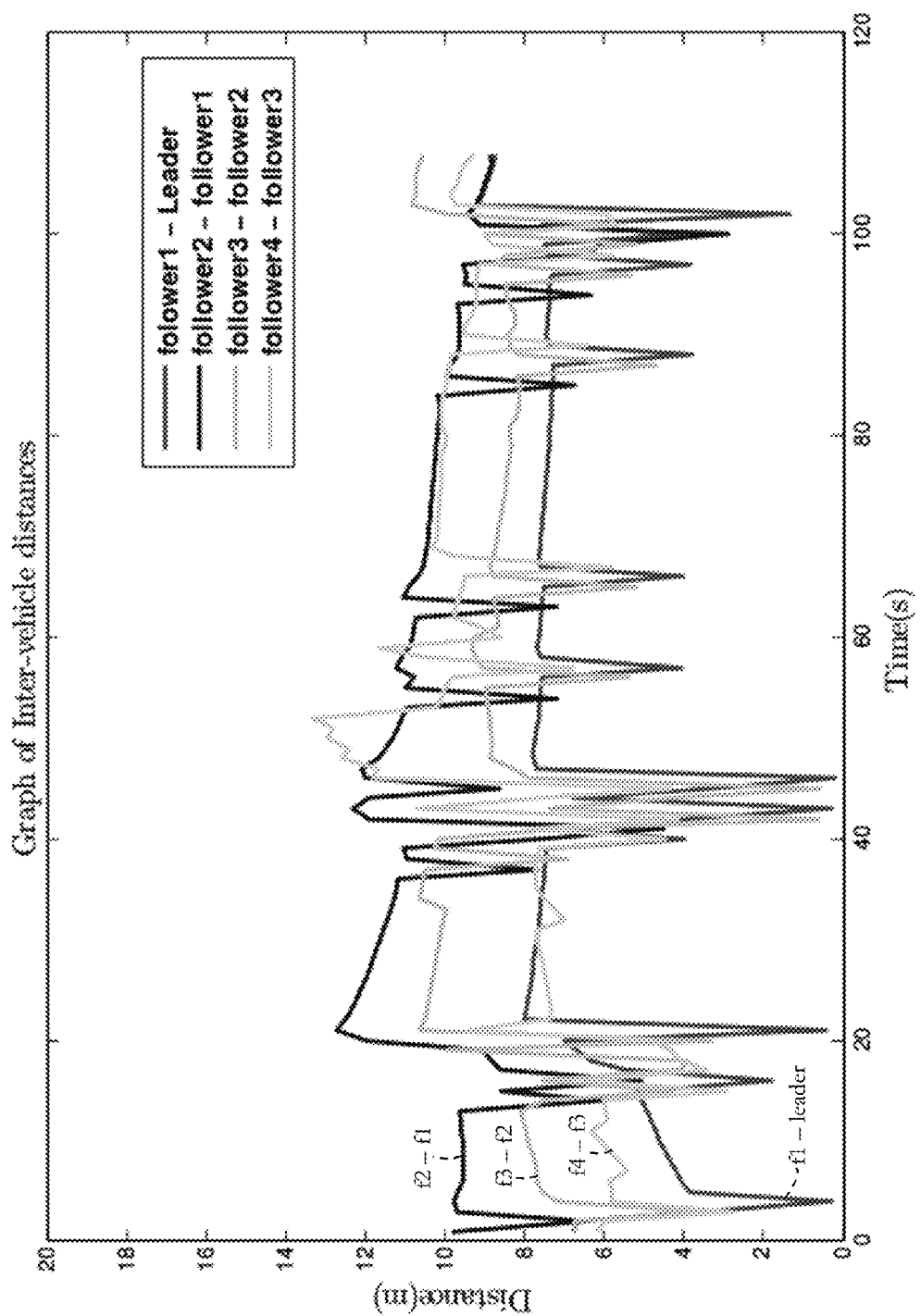
FIG. 14 shows the graph of the inter-vehicle distances against time when the vehicles are in low speeds and in the degraded mode.
Figure 15:
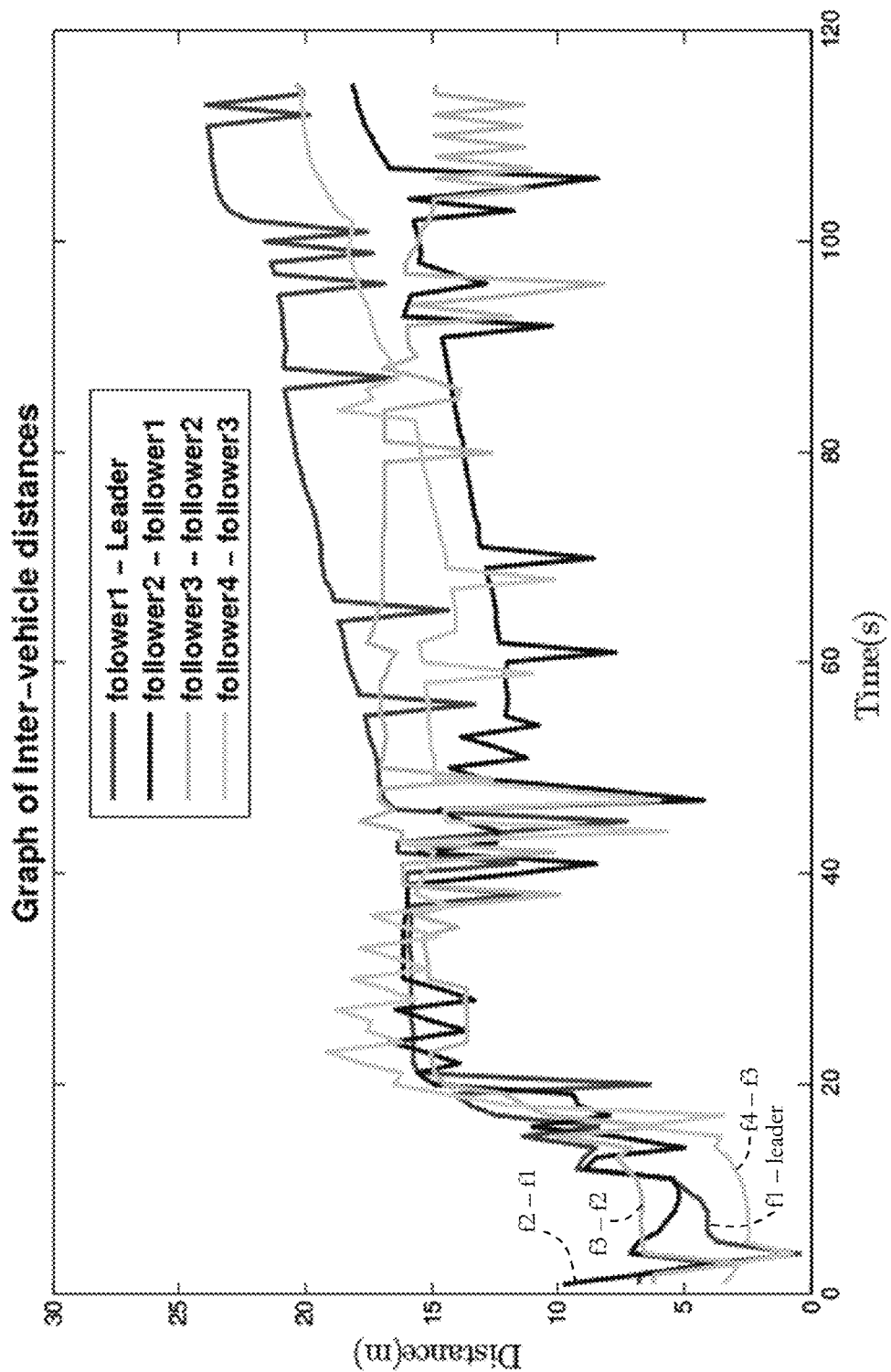
FIG. 15 shows the graph of the inter-vehicle distances against time when the vehicles are in high speeds and in the degraded mode.

The same simulations are performed in the degraded mode for both low and high speeds. As shown in FIG. 14, more oscillations can be observed than in the normal mode. Most of the distances are still in the average of [6, 9] meters with sharp decreases of distances at t=[18, 42] due to the braking performed by the preceding vehicles. It can be seen that the distance curves exhibit essentially the same shape. If the preceding vehicle decreases its distance then the follower does the same in a very short time. Therefore, the sensors are working as expected and the controllers are able to tune the suitable gains to maintain the seven meters. FIG. 15 presents the inter-vehicle distances in a high speed. It can be seen that the distances start increasing gradually between t=0 s until t=20 s. The range of distance has increased from [4, 10] meters to [14, 18] meters. Hence, the followers try to augment their safety distances in accordance to the preceding vehicle's acceleration/deceleration. Also it can be seen that the distances are equal before and after the oscillation, or sometimes increase with a low rate of 2% or 4%. Hence, the adopted control strategy is effective and the comfort of passengers is assured.

Emergency Cases: Full Braking

Figure 16:
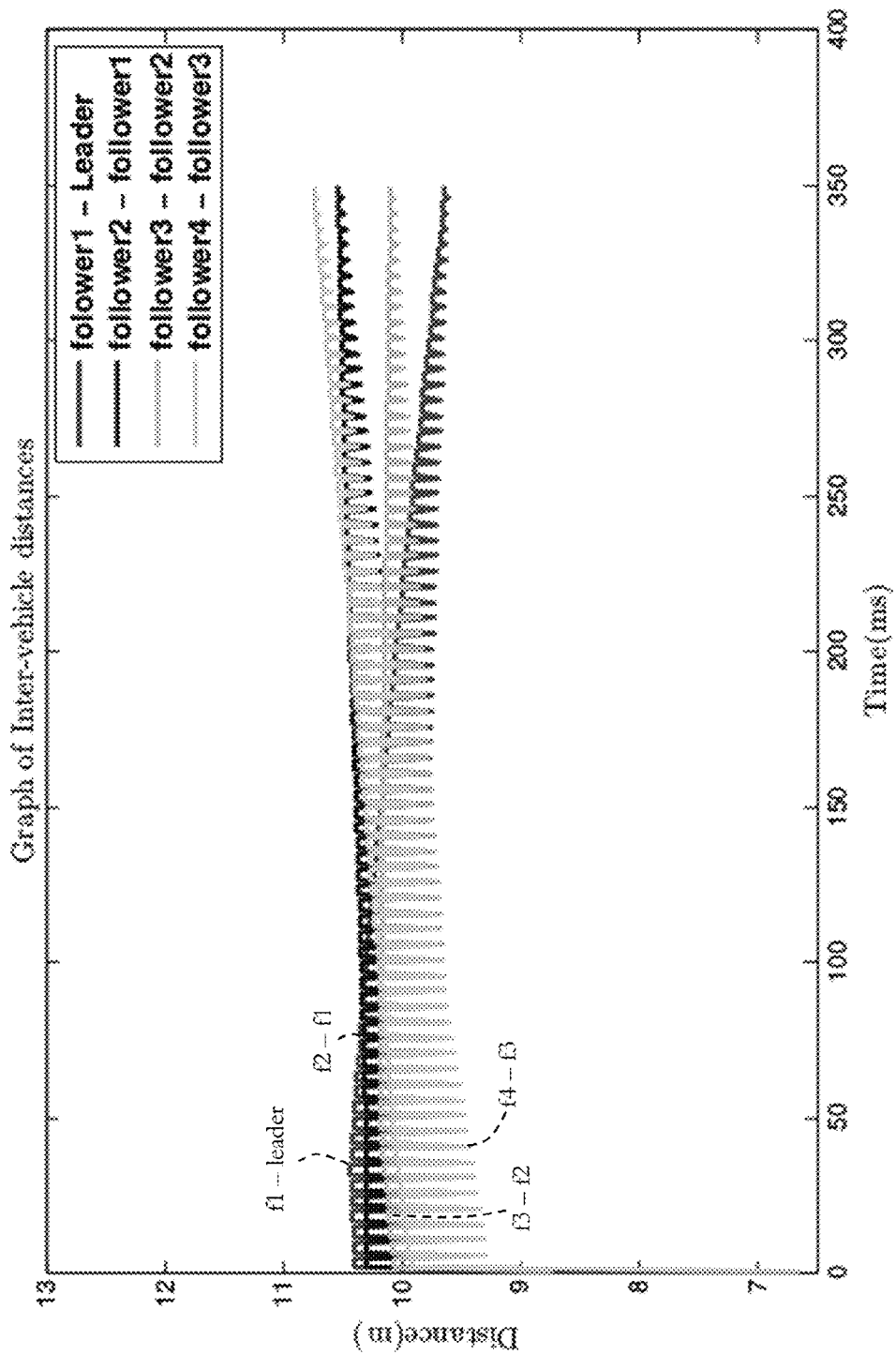
FIG. 16 shows the graph of the inter-vehicle distances when the vehicles are under a full brake and in the normal mode.

The second scenario deals with the most critical emergency case that is the full-braking event performed by the leading vehicle. In FIG. 16, the full braking is performed by the leading vehicle during the normal mode behaviour. The instant t=0 ms corresponds to the instant of the full-braking. It can be observed that in this case the follower vehicles perform sharp braking and the distances are still in the average of [9.5, 10.5] meters. Also, it can be noted that the distances have oscillations during full braking. In addition, the fluctuation of distances decreases over time until the platoon completely stops. The same experiment during the degraded mode behaviour is performed.

Figure 17:
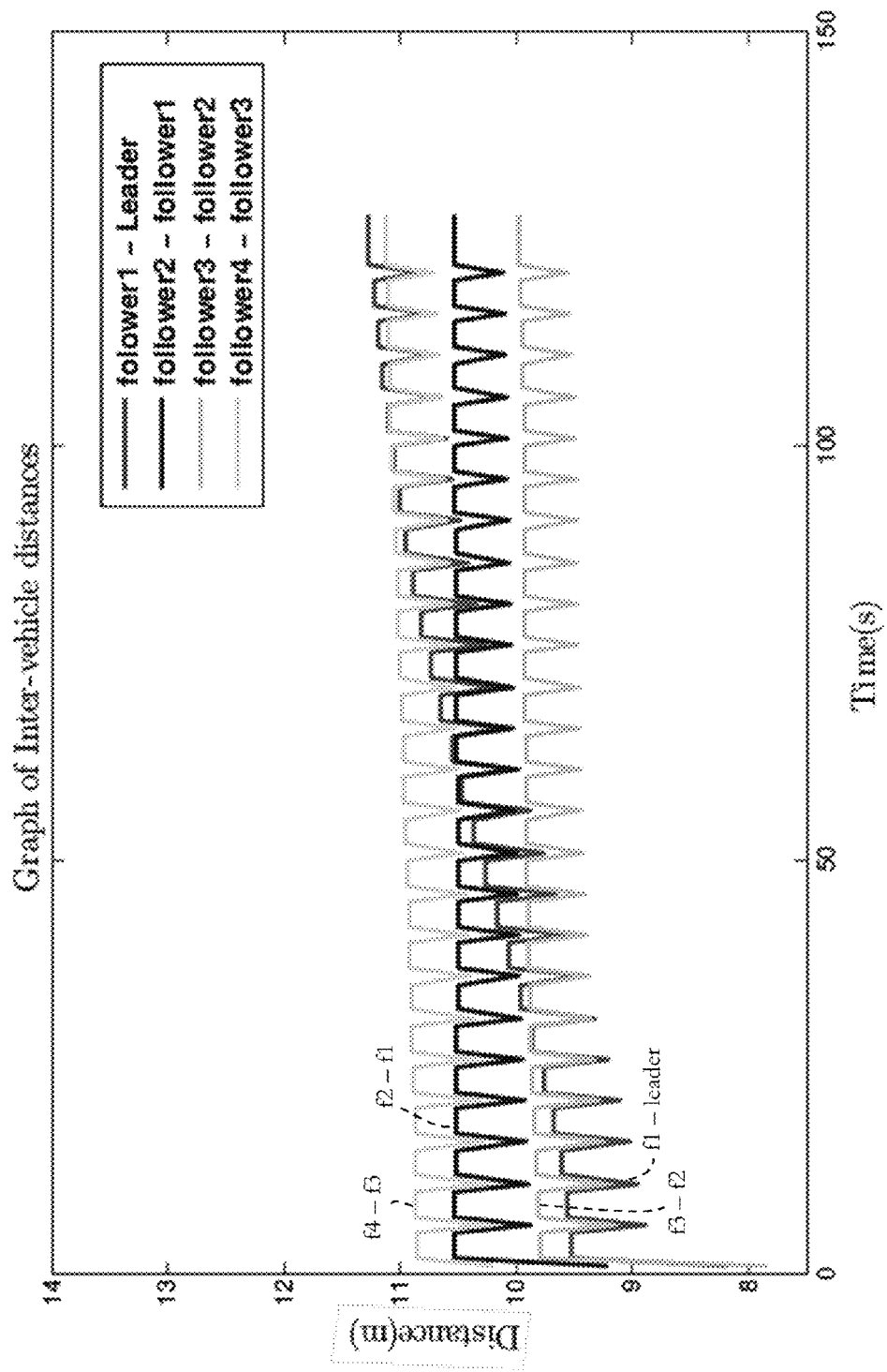
FIG. 17 shows the graph of the inter-vehicle distances when the vehicles are under a full brake and in the degraded mode.

As shown in FIG. 17, it can be observed that the distances oscillate in the average of [9, 11] meters. However, compared to the normal mode and starting from the follower 2, it can be noted that the fluctuation of distances in the degraded mode is more stable than in the normal mode. Hence, the steady state error for keeping the safe distance in a degraded mode is more efficient and more robust for such critical events.

GPS Accuracy

Figure 18:
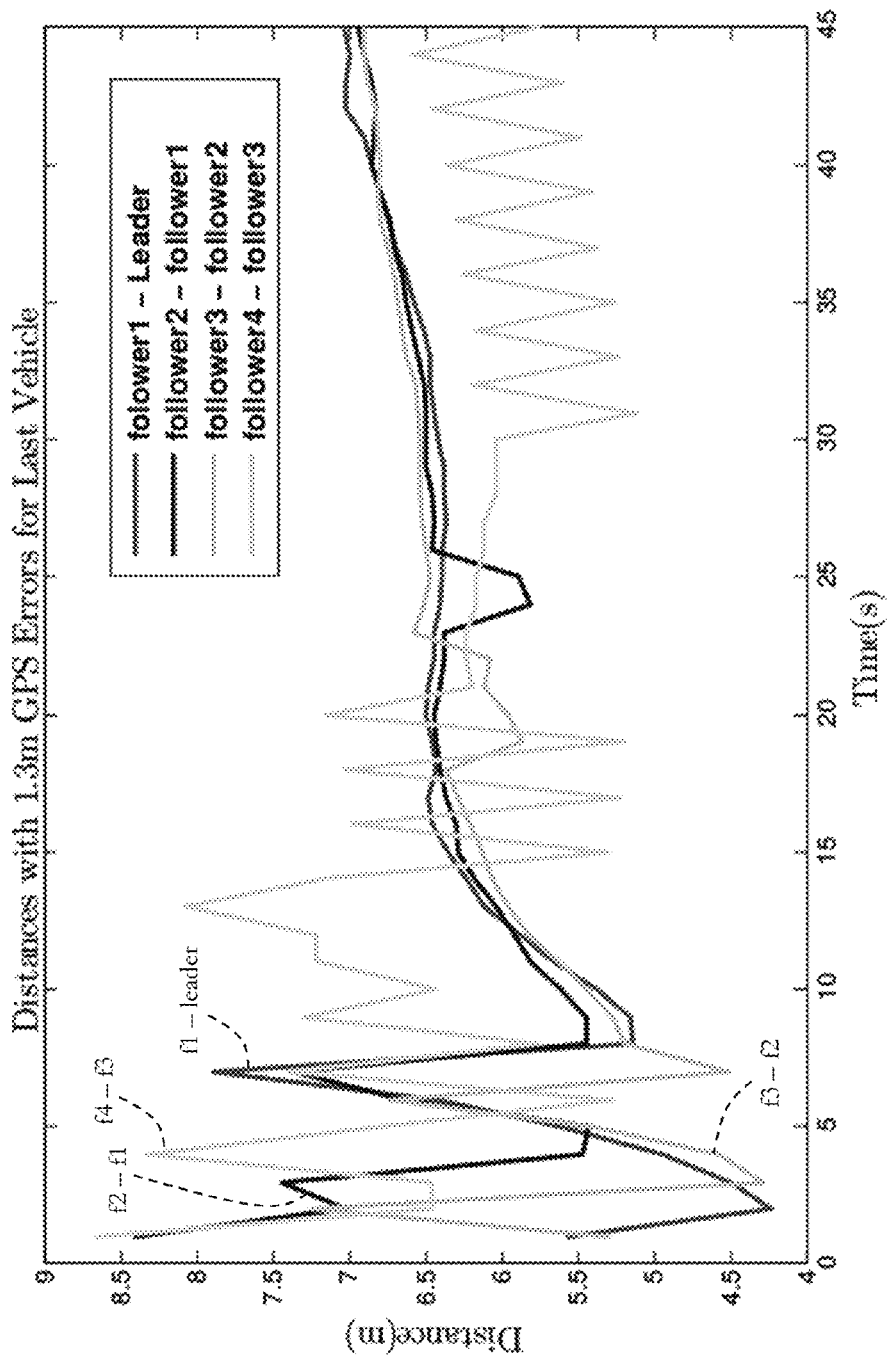
FIG. 18 shows the graph of the inter-vehicle distances when the vehicles are in the normal mode and the last follower vehicle has a low GPS accuracy.
Figure 19:
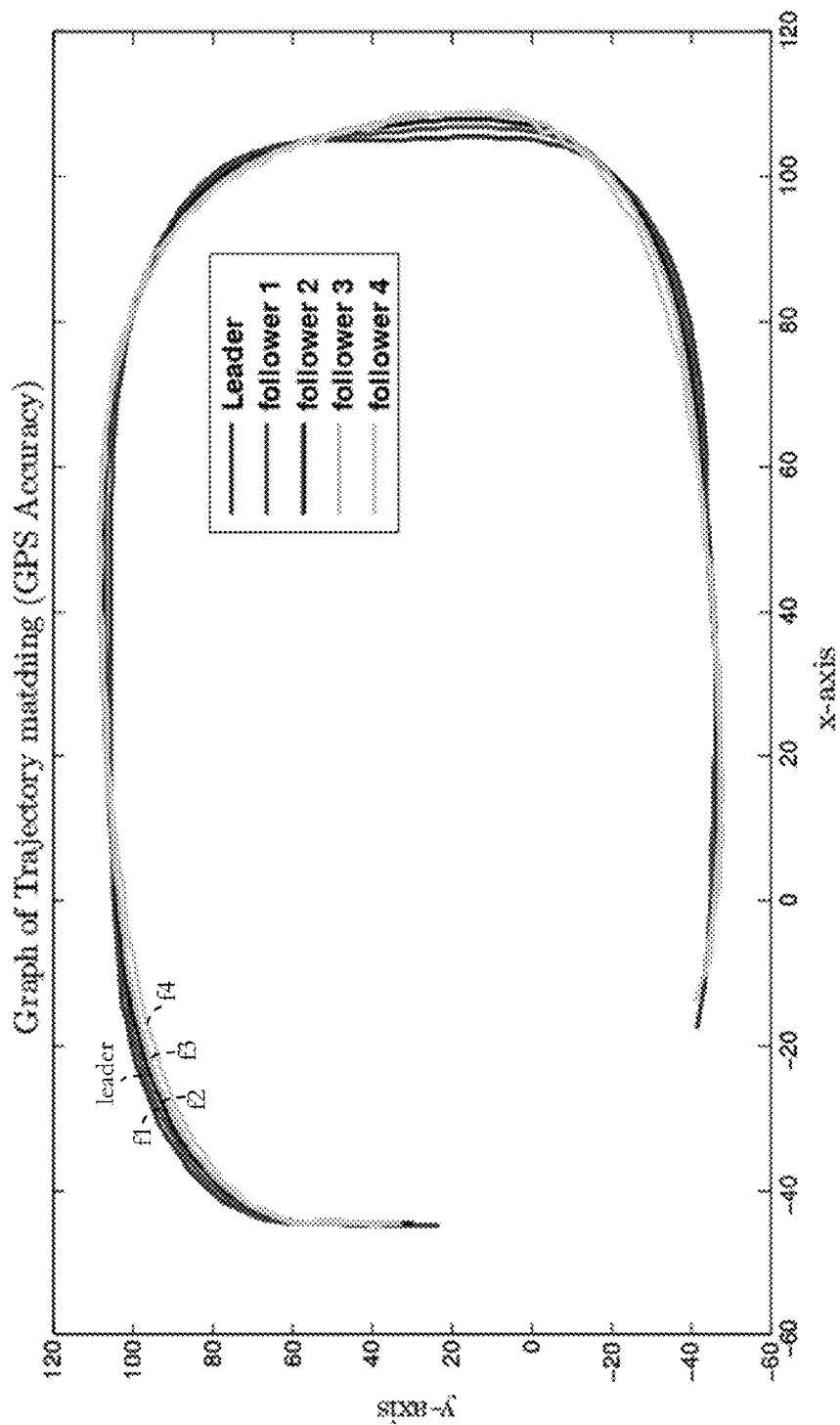
FIG. 19 shows the trajectories matching of the leader and follower vehicles illustrating the GPS errors.

The stability of the platoon in case there are some errors in the GPS accuracy is investigated. To mimic the errors, the GPS accuracy field (Table 4) in Webots needs to be modified. In previous simulations, this field is set to 0, which means that the GPS returns the precise position of each vehicle without any error. In FIG. 18, the inter-vehicle distances for the platoon moving in the normal mode within a speed of 60 km/h are studied. The GPS accuracy of the last vehicle is increased to 1.3 meters. Compared to the previous simulation (FIG. 6), it is noted that the spacing between the first three followers without GPS errors is maintained. However, the spacing between the follower 4 and 3 has significantly changed. Many oscillations have appeared and the spacing becomes in the range [5, 8.5] meters. This behaviour may not be harmful for the stability of the platoon since the fluctuation of distances in the range of 3.5 meters is not too large. Therefore, it would not hazard the passenger's comfort. In addition, the simulation has proven that the vehicle is apt to keep a good spacing with the vehicle ahead In the second scenario, the trajectory matching of vehicles after the modification of the GPS accuracy field is studied. In this case, only the GPS accuracy of the last vehicle (its trajectory with cyan colour) needs to be modified in order to compare its trajectory with other followers. The leading vehicle accelerates and decelerates during the simulation and the maximum speed is set to 80 km/h. The obtained result is shown in FIG. 19. It can be seen that the error has increased especially after performing a turning of 90°. That means that the error induced by the GPS equipment has decreased the performance of the lateral control. In addition, due to the inaccuracy of the position precision, it can be observed that the spacing between the vehicle and its neighbour has increased.

In summary, the normal mode has shown its effectiveness to keep the platoon safe during the GPS accuracy simulation. Some errors have obviously appeared for both simulations: spacing and trajectory matching due to the faults of the GPS. For that, the present embodiment proposes an assumption to enhance its performance. Since the platoon in the degraded mode is not influenced by the GPS accuracy, then the stability of the platoon can be enhanced by switching from the normal to the degraded mode in some short periods of time to check the distance measured by sensors and the distance obtained by communication. Indeed, the reliability of sensors is necessary to improve the experiment. In Webots, the DistanceSensor node can be used to model a generic sensor, an "infra-red" sensor, a "sonar" sensor or a "laser range-finder". The number of rays cast by the sensor must be equal to, or greater than 1 for "infra-red" and "sonar" sensors. The number of rays of "laser" must be exactly one. By increasing this number, an accurate model of the physical infra-red or ultrasound sensor can be obtained. Since the sonar sensor is more accurate in term of measuring distances with the vehicle in front, this sensor is preferred for real experiments. Consequently, at a random time t, the measured distance D1 can be checked by sensor and the distance D2 obtained from the GPS. Then the switching algorithm is as follows:

---
Algorithm 1 Checking Algorithm
---
1: Input D1 = DistanceSensor( ), D2 = DistanceGPS( );
2: Input t = random(timeStep),
3: Input Normal Mode = True;
4: while Normal Mode do
5:     if clock( ) == t then
6:         DeltaD = D1 − D2;
7:         if DeltaD >= 1 then
8:             set behaviour(DegradedMode);
9:         end if
10:    end if
11: end while
---

Moreover, using the Algorithm 1, it is possible to assess the situation of the long period of communication failures by comparing the received information with the other calculated by sensors. The important advantage here is that the model of the present embodiment becomes flexible to safety requirements thanks to the predefined equations for the longitudinal and lateral control. In the cases where the stability criterion is not met, there is some combination of system modes which could resolve such safety constraints.

CONCLUSION

The present invention provides a system and method for operating a follower vehicle in a vehicle platoon. Also, there is presented an initiative to study the platoon system under a Webots robot simulator. Embodiments of the present invention have provided an accurate simulation model for platoon systems. A new simulation model for a platoon system running in Webots is built to find an environment very similar to the dynamics of the vehicles. The longitudinal and lateral control were determined using the PID controller formulas. The latter is used for the control of vehicles in the different behaviours: the normal and degraded modes by identifying the gains of the controller.

In the present invention, the performance of the platoon is efficient and safe. The basic conclusions are the following:
the spacing between the vehicles in the platoon is nearly constant for a given acceleration. With some variance of the model parameters, a fast response of the system can be obtained so as to obtain a convergence status for a given safe distance,
(ii) an efficient trajectory matching is obtained for both normal and degraded modes in range [93%, 99%] due to the efficient tuning of the PID control system/method,
(iii) the platoon has a good ability to tackle emergency cases such as a harsh braking performed by the leader. Its reaction is faster than the human one and this is a good asset for safety challenges,
(iv) the degraded mode would be a good support to the normal mode in case of GPS errors and therefore, intentional switching to a degraded mode in some random periods seems to be a good idea to tackle the problem of receiving/sending wrong GPS positions. However, in all possible cases the platoon satisfies the safety requirements.

In conclusion, the simulation results show the effectiveness of the system and method in the present invention for different situations such as tracking, maintaining safe distance, handling emergency cases and studying the case of GPS errors.

It will be appreciated by persons skilled in the art that although the embodiments of the vehicle platoon comprising location units and sensors for detecting the inter-distance between the vehicles of the vehicle platoon, these embodiments may be applied to detect the inter-distance between individual following vehicles and vehicles driven by other road users other than the members of the vehicle platoon to avoid any collisions with minor modifications and without departing from the concept of the present invention.

It will be appreciated by persons skilled in the art that although the embodiments is related to the operation of a vehicle platoon with the leading and following vehicles under similar trajectories, these embodiments may be applied to operating the following vehicles under modified trajectories in relation to the leading vehicles with minor modifications and without departing from the concept of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a follower vehicle in a vehicle platoon, comprising the steps of:
   (a) determining, during operation, whether the follower vehicle is operating in a normal state or an abnormal state based on:
      an operation condition of a component of the follower vehicle, or
      a communication between the follower vehicle and a preceding vehicle in the vehicle platoon;
   (b) selecting a first control mode if the follower vehicle is in the normal state and a second control mode if the follower vehicle is in the abnormal state so as to control movement of the follower vehicle using the selected control mode;
wherein in the first control mode, the follower vehicle uses communication data received from the preceding vehicle in the vehicle platoon to control its movement; and in the second control mode, the follower vehicle uses data obtained by one or more of its sensors to control its movement;
   (c) determining, at the follower vehicle, a distance between the follower vehicle and the preceding vehicle and a deviation of the preceding vehicle with respect to the follower vehicle;
   (d) controlling a velocity of the follower vehicle so as to maintain a reference distance between the follower vehicle and the preceding vehicle and controlling turning of wheels of the follower vehicle so as to enable the follower vehicle to follow the deviation of the preceding vehicle thereby allowing the follower vehicle to substantially follow a trajectory of the preceding vehicle;
wherein the control of the velocity is based on $$u_i(t) = K_p * e_i(t) + k_i * \int e_i(t)dt + k_d * \frac{de_i(t)}{dt}$$

where $u_i(t)$ is an acceleration value of the follower vehicle $V_i$; $K_p$, $K_i$, $K_d$ are, respectively, proportional, integrator and derivative gains constant; $e_i(t)$ is an error value at time t with $ei(t)=D_{i,i-1}$-Dref; $D_{i,i-1}$ is a detected distance between the follower vehicle and the preceding vehicle; and $D_{ref}$ is the predetermined reference distance between the follower vehicle and the preceding vehicle.

2. The method in accordance with claim 1, further comprising the step of:
   receiving, at the follower vehicle, a signal indicative of the operation condition of the component or a communication signal transmitted from the preceding vehicle prior to step (a).

3. The method in accordance with claim 1, wherein the follower vehicle is determined to be operating in the abnormal state in step (a) when the component of the follower vehicle is determined to have abnormal operating condition; or the communication between the follower vehicle and the preceding vehicle is determined to have lost or have a quality below a threshold.

4. The method in accordance with claim 1, wherein, in step (a), the determination of whether the follower vehicle is operating in a normal state or an abnormal state is based on both the operation condition of the component of the follower vehicle and the communication between the follower vehicle and a preceding vehicle.

5. The method in accordance with claim 1, wherein in the first control mode, the distance is determined based on differential GPS using the following information: a local coordinate of the follower vehicle; a local orientation of the follower vehicle; and a GPS coordinate and a GPS orientation of the preceding vehicle that are received from the preceding vehicle.

6. The method in accordance with claim 5, wherein in the first control mode, the deviation is determined using the information for differential GPS and orientation information obtained using a compass at the follower vehicle.

7. The method in accordance with claim 1, wherein in the second control mode, the distance and the deviation are determined using the one or more sensors of the follower vehicle.

8. The method in accordance with claim 7, wherein the one or more sensors are arranged to transmit and receive electromagnetic or acoustic signals for distance and deviation determination.

9. The method in accordance with claim 1, wherein the control of the deviation is based on $$\theta_L(t) = \text{PID}_{Steer}(\theta_L)$$

where the $\text{PID}_{steer}$ function is defined by $$u_i(t) = K_{pl} * e_{il}(t) + k_{il} * \int e_{il}(t)dt + k_{dl} * \frac{de_i(t)}{dt};$$

where $u_i(t)$ is an acceleration value of the follower vehicle $V_i$; $e_{il}(t)$ is the error value of the follower vehicle $V_i$; $e_{il}(t)=\theta_F-\theta_L$; $\theta_F$ is an angle of travel of the follower vehicle $V_i$ at time t; $\theta_L$ is an angle of travel of the preceding vehicle $V_{i-1}$ direction at time t-$\delta$t; and $K_{pl}$, $K_{il}$, $K_{dl}$ are, respectively, proportional, integral and derivative gain constants.

10. The method in accordance with claim 9, wherein the control of the deviation further comprises the step of:
   adjusting $K_{pl}$, $K_{il}$, $K_{dl}$ so as to control the deviation of the follower vehicle.

11. The method in accordance with claim 10, wherein the adjustment of $K_{pl}$, $K_{il}$, $K_{dl}$ is dependent on a travel velocity of the follower vehicle.

12. The method in accordance with claim 1, wherein the control of the velocity further comprises the step of:
   adjusting $K_p$, $K_i$, $K_d$ so as to control the velocity of the follower vehicle.

13. The method in accordance with claim 12, wherein the adjustment of $K_p$, $K_i$, $K_d$ is dependent on a travel velocity of the follower vehicle.

14. The method in accordance with claim 1, further comprising the step of:
   momentarily switching from the first control mode to the second control mode when the follower vehicle is in the normal state.

15. The method in accordance with claim 1, further comprising the step of:
   operating the follower vehicle in a third mode at a predetermined time interval during operation of the follower vehicle, wherein in the third mode, the follower vehicle:
      determines the distance between the follower vehicle and the preceding vehicle and the deviation of the preceding vehicle with respect to the follower vehicle using the one or more sensors of the follower vehicles as well as based on data communicated from the preceding vehicle;

compares a distance and deviation measure determined based on data obtained from the one or more sensors of the follower vehicles with a distance and deviation measure determined based on data communicated from the preceding vehicle; and switches to the second control mode if the comparison result has an difference larger than a predetermined value.

16. A method for operating a follower vehicle in a vehicle platoon, comprising the steps of:
(a) determining, during operation, whether the follower vehicle is operating in a normal state or an abnormal state based on:
an operation condition of a component of the follower vehicle, or
a communication between the follower vehicle and a preceding vehicle in the vehicle platoon;
(b) selecting a first control mode if the follower vehicle is in the normal state and a second control mode if the follower vehicle is in the abnormal state so as to control movement of the follower vehicle using the selected control mode; wherein in the first control mode, the follower vehicle uses communication data received from the preceding vehicle in the vehicle platoon to control its movement; and in the second control mode, the follower vehicle uses data obtained by one or more of its sensors to control its movement;
(c) determining, at the follower vehicle, a distance between the follower vehicle and the preceding vehicle and a deviation of the preceding vehicle with respect to the follower vehicle; and
(d) operating the follower vehicle in a third mode at a predetermined time interval during operation of the follower vehicle, wherein in the third mode, the follower vehicle:
determines the distance between the follower vehicle and the preceding vehicle and the deviation of the preceding vehicle with respect to the follower vehicle using the one or more sensors of the follower vehicles as well as based on data communicated from the preceding vehicle;
compares a distance and deviation measure determined based on data obtained from the one or more sensors of the follower vehicles with a distance and deviation measure determined based on data communicated from the preceding vehicle; and
switches to the second control mode if the comparison result has a difference larger than a predetermined value.

17. A method for operating a follower vehicle in a vehicle platoon, comprising the steps of:
(a) determining, during operation, whether the follower vehicle is operating in a normal state or an abnormal state based on:
an operation condition of a component of the follower vehicle, or
a communication between the follower vehicle and a preceding vehicle in the vehicle platoon;
(b) selecting a first control mode if the follower vehicle is in the normal state and a second control mode if the follower vehicle is in the abnormal state so as to control movement of the follower vehicle using the selected control mode; wherein in the first control mode, the follower vehicle uses communication data received from the preceding vehicle in the vehicle platoon to control its movement; and in the second control mode, the follower vehicle uses data obtained by one or more of its sensors to control its movement;
(c) determining, at the follower vehicle, a distance between the follower vehicle and the preceding vehicle and a deviation of the preceding vehicle with respect to the follower vehicle; and
(d) controlling a velocity of the follower vehicle so as to maintain a reference distance between the follower vehicle and the preceding vehicle and controlling turning of wheels of the follower vehicle so as to enable the follower vehicle to follow the deviation of the preceding vehicle thereby allowing the follower vehicle to substantially follow a trajectory of the preceding vehicle; wherein the control of the deviation is based on $$\theta_L(t) = \text{PID}_{Steer}(\theta_L)$$

where the $\text{PID}_{steer}$ function is defined by $$u_i(t) = K_{pl} * e_{il}(t) + k_{il} * \int e_{il}(t)dt + k_d * \frac{de_i(t)}{dt};$$

where $u_i(t)$ is an acceleration value of the follower vehicle $V_i$; $e_{il}(t)$ is the error value of the follower vehicle $V_i$; $e_{il}(t) = \theta_F - \theta_L$; $\theta_F$ is an angle of travel of the follower vehicle $V_i$ at time t; $\theta_L$ is an angle of travel of the preceding vehicle $V_{i-1}$ direction at time t-δt; and $K_{pl}$, $K_{il}$, $K_{dl}$ are, respectively, proportional, integral and derivative gain constants.

18. A method for operating a follower vehicle in a vehicle platoon, comprising the steps of:
(a) determining, during operation, whether the follower vehicle is operating in a normal state or an abnormal state based on:
an operation condition of a component of the follower vehicle, or
a communication between the follower vehicle and a preceding vehicle in the vehicle platoon;
(b) selecting a first control mode if the follower vehicle is in the normal state and a second control mode if the follower vehicle is in the abnormal state so as to control movement of the follower vehicle using the selected control mode; wherein in the first control mode, the follower vehicle uses communication data received from the preceding vehicle in the vehicle platoon to control its movement; and in the second control mode, the follower vehicle uses data obtained by one or more of its sensors to control its movement; and
(c) determining, at the follower vehicle, a distance between the follower vehicle and the preceding vehicle and a deviation of the preceding vehicle with respect to the follower vehicle; wherein in the first control mode, the distance is determined based on differential GPS using the following information: a local coordinate of the follower vehicle; a local orientation of the follower vehicle; and a GPS coordinate and a GPS orientation of the preceding vehicle that are received from the preceding vehicle.

* * * * *